US005955546A

United States Patent [19]
Bates et al.

[11] Patent Number: 5,955,546
[45] Date of Patent: Sep. 21, 1999

[54] MISCIBLE POLYOLEFIN BLENDS

[75] Inventors: Frank S. Bates, St. Louis Park, Minn.;
Jeffrey H. Rosedale, Philadelphia, Pa.;
Mark F. Schulz, Minneapolis, Minn.;
Kristoffer Almdal, Roskilde, Denmark

[73] Assignee: Regents of the University of Minnesota

[21] Appl. No.: 09/007,975

[22] Filed: Jan. 16, 1998

Related U.S. Application Data

[60] Division of application No. 08/311,410, Sep. 23, 1994, Pat. No. 5,710,219, which is a continuation-in-part of application No. 08/189,863, Feb. 1, 1994, Pat. No. 5,571,864, which is a continuation-in-part of application No. 08/036,013, Mar. 23, 1993, abandoned.

[51] Int. Cl.$^6$ ...................................................... C08L 23/04
[52] U.S. Cl. .............................. 525/240; 525/64; 525/91; 525/94; 525/95; 525/96; 525/98
[58] Field of Search ................................ 525/240, 64, 91, 525/94, 95, 96, 98

[56] References Cited

U.S. PATENT DOCUMENTS

| | | |
|---|---|---|
| 3,627,852 | 12/1971 | Aishima . |
| 3,634,552 | 1/1972 | Foglia . |
| 4,140,162 | 2/1979 | Gajewski et al. . |
| 4,153,587 | 5/1979 | Yui . |
| 4,210,686 | 7/1980 | Gajewski et al. . |
| 4,226,952 | 10/1980 | Halasa . |
| 4,230,767 | 10/1980 | Isaka et al. . |
| 4,320,084 | 3/1982 | Elgner . |
| 4,369,284 | 1/1983 | Chen . |
| 4,412,016 | 10/1983 | Fukui et al. . |
| 4,705,823 | 11/1987 | Choi et al. . |
| 4,894,417 | 1/1990 | Holden . |
| 4,943,615 | 7/1990 | Yamawaki . |
| 5,093,422 | 3/1992 | Himes . |
| 5,206,075 | 4/1993 | Hodson, Jr. . |
| 5,276,100 | 1/1994 | Coolbaugh et al. . |
| 5,376,439 | 12/1994 | Hodgson et al. . |

FOREIGN PATENT DOCUMENTS

| | | |
|---|---|---|
| 0 358 898 | 7/1989 | European Pat. Off. . |
| 0 527 390 | 7/1992 | European Pat. Off. . |
| 2 009 263 | 1/1970 | France . |
| 1 905 206 | 3/1971 | Germany . |
| 58-145751 | 8/1983 | Japan . |
| 58-210950 | 12/1983 | Japan . |
| 61-103975 | 5/1986 | Japan . |
| 1 196 338 | 8/1989 | Japan . |
| 1 232 453 | 5/1971 | United Kingdom . |
| 1 285 932 | 12/1971 | United Kingdom . |
| WO 93/03093 | 2/1993 | WIPO . |

OTHER PUBLICATIONS

Balsara, N. P., et al., "Thermodynamic Interactions in Model Polyolefin Blends Obtained by Small Angle Neutron Scattering," *Macromolecules*, 25, 6137–6147 (1992).
Bates and Wignall, "Absolute Calibration of Small–Angle Neutron Scattering Data," *J. Appl. Cryst.*, 20, 28–40 (1987).
Bates, F. S., "Isotactic Polypropylene–Compatible Block Copolymers," *J. of Polymer Science: Part B: Polymer Physics*, 33, 1423–1427 (1995).
Bates, F. S., "Phase Behavior, Structure, and Properties of Model Block Polymers," Abstract of Final Report of Air Force Contract No. AFOSR–90–0207 obtained from NTIS database on Dialog.
Bates, F. S., "Polymer—Polymer Phase Behavior," *Science*, 251, 898–905 (1991).
Bates, F. S., Untitled Abstract of NSF Grant No. 8957386 obtained from Federal Research in Progress on Dialog.
Bates, F. S., "Conformational Asymmetry and Polymer—Polymer Thermodynamics," *Macromolecules*, 27, 1065–1067 (1994).
Bates, F. S., "Correlation of Binary Polyolefin Phase Behavior with Statistical Segment Length Asymmetry," *Macromolecules*, 5547–5550 (1992).
"Exact™ Plastomers, Targeted Performance for Extrusion, Molding and Polymer Modification," *Exxon Chemical*, (1994).
"Exact™ Facts," *Exxon Chemical*, 1, 1–3 (Feb. 1992).
"Exact™ Facts," *Exxon Chemical*, 2, 1–7 (Jun. 1993).
"Exxpol™ Technology, Single Site–Catalyzed Polymerization Technology, A Breakthrough for Film Packaging," *Exxon Chemical*, 1–4.
Fetters et al., "Connections between Polymer Molecular Weight, Density, Chain Dimensions, and Melt Viscoelastic Properties," *Macromolecules*, 27(17), 4639–4647 (1994).
Flaris et al., "The role of various compatibilizers in an iPP/LLDPE blend," *Mater. Forum.*, 16(2), 181–184, Chemical Abstract No. 118:235114 (1992).
Guinier et al., *Small Angle Scattering of X–Rays*, John Wiley & Sons, Inc., New York (1955), Cover Page and Table of Contents.
Kurata et al., *Polymer Handbook*, Third Edition, Section VII, Eds. J. Bandrup et al., John Wiley & Sons, Inc. (1989).
Kurata et al., *Polymer Handbook*, Third Edition, Section V, Eds. J. Bandrup et al., John Wiley & Sons, Inc. (1989).
Leaversuch, R., "Add very low density PE to the list of options in polyolefin resins," *Modern Plastics*, 48–50 (Jul. 1992).

(List continued on next page.)

*Primary Examiner*—Helen L. Pezzuto
*Attorney, Agent, or Firm*—Mueting, Raasch & Gebhardt, P.A.

[57] ABSTRACT

The invention relates to melt-miscible polyolefin blends, and a process for preparing the melt-miscible blends, of two or more polyolefins. Matching, within defined limits, the segment length of a modifying polyolefin with the segment length of a primary polyolefin, such as polypropylene or an ethylene/alpha-olefin copolymer, provides blends of the "matched" components which blends were heretofore unknown to be melt-miscible. A broad range of polyolefin blend compositions, and of polyolefin blends containing other polymers made compatible or dispersible with the polyolefin blend compositions, are defined, all of the blend compositions having at least one melt-miscible polyolefin phase.

5 Claims, 1 Drawing Sheet

OTHER PUBLICATIONS

Lindsay, K., (ed.), "First 'single–site catalyst' PEs are for medical and cable applications," *Modern Plastics*, 62 (Jul. 1992).

Liu, A. J., et al., "Influence of Nematic Fluctuationson the phase Separation of Polymer blends," *Macromolecules*, 25, 5551–5553 (1992).

Lohmar et al., "Examples of intrinsically and extrinsically determined phase morphologies in polymer alloys," *Makromol. Chem.*, Macromol. Symp., 16, 161–173 (1988), Chemical Abstract No. 108:205498.

Olabisi O., et al., *Polymer—Polymer Miscibility*, Academic Press, 340–341 (1979).

Olabisi, O., et al., *Polymer—Polymer Miscibility*, Academic Press, Inc. (1979)—Cover Page and Table of Contents.

Schwank, D., "Single–site metallocene catalysts yield tailor–made polyolefin resins," *Modern PlasticsU*, 49–50 (Aug. 1993).

Sugimoto et al., "Manufacture of ethylene–propylene block copolymers," Japanese Patent No. 06–172465, (Jun. 21, 1994), Chemical Abstract No. 122:106785.

Toensmeier, P., "TPE formulations show new versatility," *Modern Plastics*, 70–71, 73, 75 (May 1995).

Walsh, D. J., et al, "Equation of State and Predictions of Miscibility for Hydrocarbon Polymers," *Macromolecules*, 25, 5236–5240 (1992).

Wignall, "Neuron Scattering," *Encyclopedia of Polymer Science and Engineering*, 10, 112–184 (1987).

MISCIBLE POLYOLEFIN BLENDS

This is a division of application Ser. No. 08/311,410, filed Sep. 23, 1994, now U.S. Pat. No. 5,710,219 which is a continuation-in-part of application Ser. No. 08/189,863, filed Feb. 1, 1994, now U.S. Pat. No. 5,571,864 which is a continuation-in-part of application Ser. No. 08/036,013, filed Mar. 23, 1993, now abandoned, are incorporated herein by reference.

FIELD OF THE INVENTION

This invention relates to new blends of polyolefins. More specifically, the invention relates to melt-miscible blends, and a process for preparing melt-miscible blends, of two or more polyolefins, which blends heretofore were not known to be miscible or even partially miscible. The invention also relates to novel compositions of melt-miscible blends of polypropylene or other polyolefins, such as ethylene-propylene copolymers, with one or more modifying polyolefins. The invention also relates to melt-miscible polyolefin blends containing other polymers. Blends of the invention, in addition to having miscibility in the melt, are useful in making molded polyolefin articles of improved clarity, impact strength, and processability.

BACKGROUND OF THE INVENTION

One of the great mysteries of the plastics art has been, until now, an understanding of why isotactic polypropylene (PP) and polyethylene (PE) are immiscible even though they are chemically so similar. Understanding, controlling, and using the factors affecting the melt-miscibility of one polyolefin with another, for example with polypropylene, have been long-sought goals in the art. Theories abound to explain the miscibility between polymer pairs having dipolar, hydrogen-bonding, or ionic interactions. These are types of interactions which bring significant exothermic (enthalpic) contributions to the free energy of mixing. However, no theory has proven effective at explaining the general lack of miscibility of pairs of polyolefins, the polyolefins having no significant enthalpic contributions to their free energy of mixing, nor has a practical application been made in producing miscible blends of polyolefins based on our newly discovered understanding of the miscibility behavior of the polyolefins.

The problem of predicting and achieving melt-miscibility among blends of polyolefins, particularly when PP is one of the polyolefins, and achieving a concomitant improvement of certain mechanical properties in the resulting blend, had not been overcome previously. The present invention provides the composition of such blends and a process to make miscible blends of two or more polyolefins. (The inventors have reviewed several theories which have not proven applicable to the polyolefin miscibility problem and have provided some theoretical background related to this invention, in *Macromolecules,* 1992, 25, 5547–5550.) Some workers in the art indeed have attempted to produce useful polyolefin blends (see, for example, U.S. Pat. No. 4,226, 952), but they have not recognized that some of their blends might be miscible, nor did they identify a preference for those that are now understood to be miscible in the melt. The present invention also describes how to make miscible blends in combination with other polymers and how to take advantage of the inventive process to produce blends having improved properties and performance characteristics over their less miscible blend counterparts. Application of the now-understood miscibility of certain polyolefins results in practical blends having functionalized, block or graft polymers containing a miscible polyolefin segment.

SUMMARY OF THE INVENTION

It is known that polyolefins of useful molecular weights generally do not mix with one another, that is, they generally are not "miscible in the melt." We have confirmed this general phenomenon, but have discovered exceptions to it. In the process of our discovery, we have come to understand and apply the underlying characteristics determining polyolefin miscibility. We have found, for example, that polyolefins which have similar macromolecular conformations per unit volume are miscible in the melt. With this understanding, polyolefins can be predicted to be melt-miscible when their macromolecular conformations per unit volume have certain prescribed and predictable size characteristics within certain mutual limits. Such a conformational characteristic, it will be shown, is determined quantitatively from the "segment length" of a given polyolefin. (The term, "segment length" (abbreviated "SL") also may be defined as a "statistical" segment length, as will be further described.) The polyolefins proposed for melt-miscible blending, for example, a "primary" polyolefin such as polypropylene or an ethylene/alpha-olefin random copolymer, e.g. an ethylene/propylene copolymer, and a series of potential "modifying" polyolefins, for example, a broad range of random copolymers of ethylene units with one or more monomer units selected from 1-butene, 1-hexene, 1-octene, 4-methyl-1-pentene, 3-methyl-1-butene, alternating ethylene-propylene, 2-methyl-1-butene, and the like, and mixtures thereof, each is subjected to a quantitative estimation of its SL. Within limits to be defined, primary and selected modifying polyolefins having "matched SLs" may be melt mixed to yield melt-miscible polyolefin blend compositions.

The segment length (SL) is one measure of the "shape" of a polymer molecule and, unless otherwise noted, is given in Angstrom units. If a constant statistical segment volume is defined for each of two polymers, the polymer having the greater "segment length" will have a more extended (less coiled) polymer chain. This concept is further elaborated as follows: At temperatures above the melting point, polymer molecules coil into random walk conformations. Theory and experiment have definitively shown that the radius-of-gyration, Rg, which is a convenient measure of the average coil dimension, is proportional to the square-root of the molecular size. The molecular size can be characterized by the molecular weight, or the degree of polymerization, or the number of statistical segments. A statistical segment is defined such that the number of statistical segments, N, when multiplied by the molecular weight of the statistical segment, equals the polymer molecular weight. With this definition of N, the SL is specified by $SL=Rg/(N/6)^{1/2}$ as a direct consequence of the well established Gaussian statistics that govern polymer melts. For the present purposes we will define the SL for polyolefins based on an arbitrarily chosen common segment volume. Specifying a SL requires an experimentally determined value of Rg (e.g., as determined from a small-angle neutron scattering measurement) and the polymer density.

By way of preliminary example, several polyolefins and their calculated SL values are provided in Table A (the SL calculated by methods described in detail hereinbelow, where the segment volume at 25° C. has been arbitrarily chosen as $1.08 \times 10^{-22}$ cm$^3$):

TABLE A

Representative Polyolefins and Calculated Segment Length

| Polyolefin | Abbrev. | Calculated SL in Å |
|---|---|---|
| polyethylene | (PE) | 8.8 |
| poly(ethylene-propylene) | (PEP) | 7.3 |
| poly(methylethylethylene) | (PMEE) | 7.2 * |
| polypropylene | (PP) | 6.2 |
| poly(ethylethylene) | (PEE) | 5.0 |
| poly(isopropylethylene) | (PiPE) | 5.3 (4.2) * |

* From most recent determination; Table 2A.

We have discovered, for example, that particular combinations of hydrogenated polybutadiene or polyisoprene units, which particular combinations each have their SL's within proximity of (i.e. within a number of percentage points of) 6.2, are completely melt-miscible with PP (having a calculated SL of 6.2, the calculation to be described below), which blends heretofore were unknown to be in a miscible state.

Although certain examples of polyolefins that we predict to be miscible with polypropylene have been described compositionally elsewhere, there is no prior indication that some were recognized as miscible nor was there a preference shown for those that are miscible.

Thus, there is provided a polyolefin blend, preferably a melt-miscible polyolefin blend, comprising:

a) a primary polyolefin having a primary polyolefin segment length (preferably from about 50 to about 99.8 weight percent, based on the blend weight); and b) at least one modifying polyolefin (preferably from about 0.2 to about 50 weight percent, based on the blend weight), wherein the modifying polyolefin has a modifying polyolefin segment length within about 85% to about 115% of the primary polyolefin segment length. A preferred blend has the primary polyolefin selected from polypropylene or an ethylene/alpha-olefin copolymer and the modifying polyolefin is a random copolymer derived from ethylene and one or more monomer units selected from a lower olefin, a lower diolefin, or mixtures of these. "Lower" olefins and diolefins are described more fully below.

There is further provided a polyolefin blend, preferably a melt-miscible polyolefin blend, within the broad description immediately above, wherein a) the segment length of the primary polyolefin is within a range of absolute value of from about 4.2 to about 8.8 Angstroms; and b) the monomer units of the modifying polyolefin are selected from propylene, 1-butene, butadiene, 1-pentene, 1-hexene, 1-octene, isoprene, 2-methyl-1-butene, 3-methyl-1-butene, 4-methyl-1-pentene, or mixtures thereof; and wherein the the range and the absolute value of the primary polyolefin segment length and the modifying polyolefin segment length are determined from an arbitrarily chosen common segment volume of $1.08 \times 10^{-22}$ cubic centimeters.

The above-described polyolefin blends have a primary polyolefin segment length (which may be designated "SL-1") or a modifying polyolefin segment length ("SL-X") each of which have a relationship:

$$(SL\text{-}1 \text{ or } SL\text{-}X) = Rg/(N/6)^{1/2},$$

wherein Rg is a measured radius of gyration of the primary or the modifying polyolefin, respectively; N is a number of statistical segments in an average polymer chain of the primary or modifying polyolefin, respectively, the average chain having a weight average molecular weight (Mw), and wherein N is determined from a relationship $$N=(Mw/A)/(p \times V),$$

wherein A is Avogadro's number, p is a measured density, and V is an arbitrarily chosen common segment volume, and wherein each term relates to the primary or modifying polyolefin, respectively.

There is further provided a process for making a melt-miscible polyolefin blend, comprising melt-blending a) a primary polyolefin (preferably from about 50 to about 99.8 weight percent, based on the blend weight) selected from polypropylene or ethylene/alpha-olefin copolymer having a primary polyolefin segment length within a range of absolute value of from about 4.2 to about 8.8, and b) at least one modifying polyolefin (preferably from about 0.2 to about 50 weight percent, based on the blend weight) comprising a random copolymer of ethylene and one or more monomer units selected from propylene, 1-butene, butadiene, 1-pentene, 1-hexene, 1-octene, isoprene, 2-methyl-1-butene, 3-methyl-1-butene, 4-methyl-1-pentene, or mixtures thereof, wherein the modifying polyolefin has a modifying polyolefin segment length within about 85% to about 115% of the primary olefin segment length, and further wherein the range and the absolute value of the primary polyolefin segment length and the modifying polyolefin segment length are based upon an arbitrarily chosen common segment volume of $1.08 \times 10^{-22}$ cubic centimeters, the melt-blending yielding the melt-miscible blend.

The blends which result from the compositions and process of the invention generally have improved physical properties. For example, one improved property is clarity in the melt and in the frozen state, which clarity is superior to the clarity of polyolefin blends that are made from polyolefins not having similar statistical segment lengths. In some cases, clarity which is superior to that of the individual polyolefin components of the blend is achieved. Certain blends of the invention also have improved impact strength and other desirable properties, as will be further described. Additionally, modifying polyolefins that are miscible with, for example, a primary polyolefin such as polypropylene (PP), can be used as "processing aids" for the processing of PP. In this use, the modifying miscible polyolefins are believed to act to increase the rate of PP crystallization, yielding smaller crystallites and greater clarity of the resulting blend. In some blends, the increased rate of crystallization provides a faster rate of solidification of the polymer from the melt, consequently leading to faster cycles and greater productivity. Some of the miscible modifying polyolefins also may act as impact modifiers, increasing the impact strength of the resulting polyolefin blend while also maintaining or increasing clarity. The miscible modifying polyolefins also may be used to increase the low shear viscosity of their resulting blend without increasing the high shear viscosity of the blend, an important fabrication utility in, for example, thermoforming, blow molding, and film extrusion of polyolefin blends.

The miscible modifying polyolefin may also be used to "compatibilize" or to improve the dispersion of other groups attached to the modifying polyolefin with the primary polyolefin. "Compatibilization" or "improved dispersion" can occur, for example, when functional groups, or certain polar polymer segments, or combinations of these, are covalently (or ionically) attached to the modifying polyolefin. The modifying polyolefins, so further modified, can be used in a polyolefin blend to increase the melt strength of the primary polyolefin component, to increase its modulus, and to increase its rate of crystallization. Such modifying polyolefins also may increase the polarity of the surface relative to the polarity of the primary olefin, thereby providing increased paintability, printability, and adhesion toward polar substrates. Modifying polyolefins so further modified also can act as compatibilizers to provide polyolefin blends having improved properties over the properties of the primary polyolefin blended with polar polymers and inorganic substrates.

The miscible modifying polyolefin, with or without functional groups or polar polymer segments, can also be used to modify the surface of the primary polyolefin. This can be done, for example, by applying the miscible modifying polyolefin to the surface of the primary polyolefin. Such surface-coated primary polyolefins are also referred to herein as "blends."

DETAILED DESCRIPTION OF THE INVENTION

Figure 1:
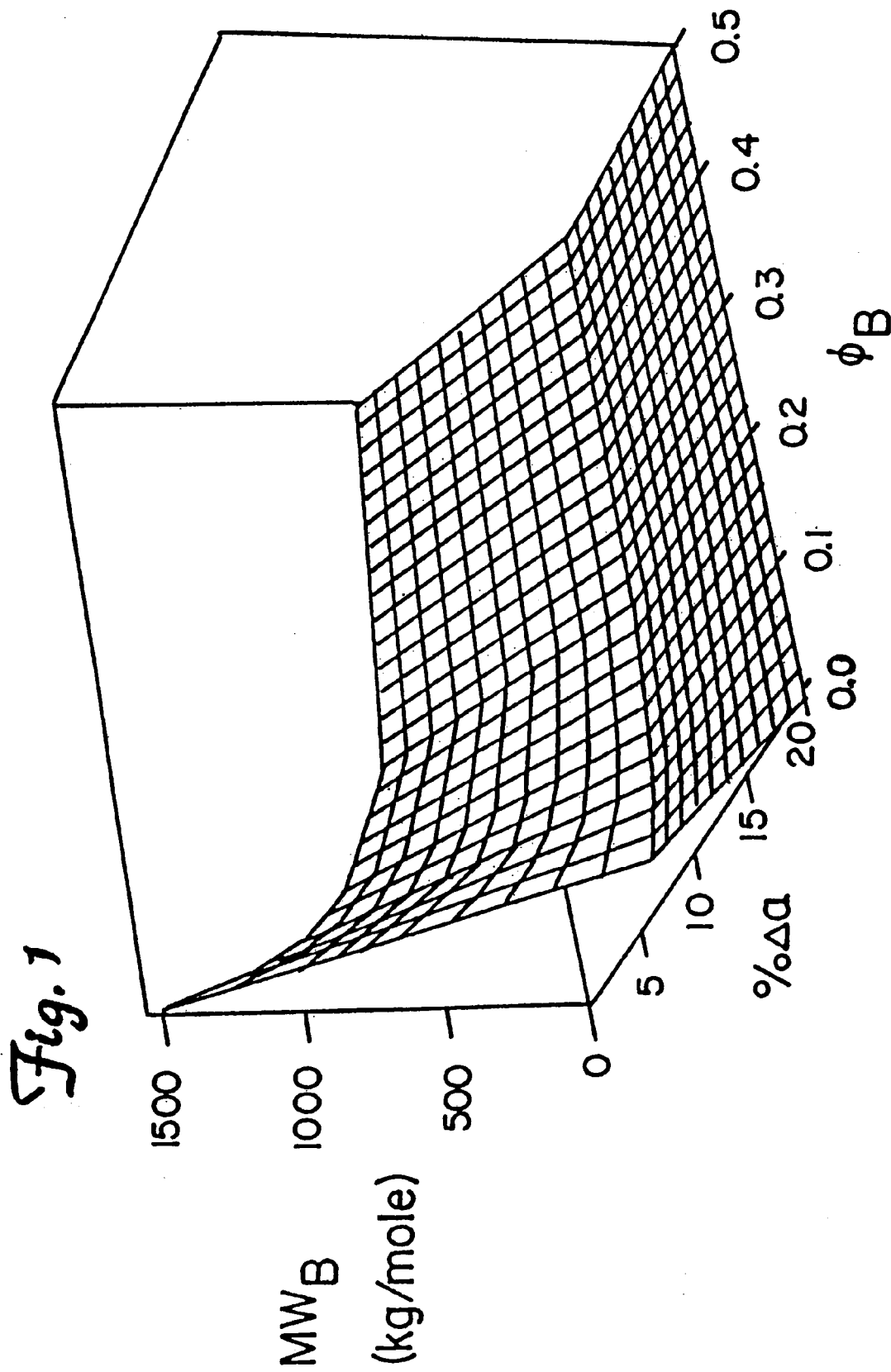
FIG. 1 is a graph depicting maximum molecular weight of polyolefin B versus % Δa having miscibility with a polyolefin A of molecular weight 300,000 at the limit of the Δa range, also given in table form herein.

The term "polyolefin" refers to a polymer which may be also described as "a saturated hydrocarbon;" its backbone and side-chains are composed solely of units of saturated carbon atoms having only hydrogen (or deuterium) attached. "Polyolefin" includes those saturated hydrocarbon polymers produced by free radical, organometallic, or other known methods of polymerization of olefins, and includes, for example, polyethylene, polypropylene, poly-1-butene, and poly-4-methyl-1-pentene. It also includes random copolymers of these with other olefin monomers such as isobutylene, 1-pentene, 1-hexene, 1-octene, 1-dodecene, 4-vinyl cyclohexane, 4-vinyl cyclohexene, cycloalkenes such as cyclohexene, norbornylene, and the like, and also includes, for example, diene monomers such as butadiene, isoprene, cyclodienes such as cyclopentadiene, dicyclopentadiene, norbornyldiene, and the like, which, following polymerization and hydrogenation, yield "olefin polymers" often described in the art as "polyolefins." Included are the ethylene/alpha-olefin, such as ethylene-propylene, copolymers, and the ethylene copolymers with 1-butene, 1-hexene, 1-pentene, 1-octene, and 4-methyl-1-pentene, including those high ethylene content copolymers commonly referred to as linear, low-density polyethylenes as well as those containing lesser amounts of ethylene.

Any of these could be used as "primary polyolefins" of the invention. Preferred, however, as primary polyolefins due to their availability, cost, and useful properties are the polyolefins which include polypropylene, propylene copolymers, or an ethylene/alpha-olefin random copolymer, for example an ethylene/propylene copolymer. Polypropylene polymers and its copolymers may be isotactic, syndiotactic, or atactic; of these, isotactic is preferred due to its currently wide commercial availability and broad use. Syndiotactic and atactic polypropylene may find special applications within the invention.

"Modifying polyolefins" of the invention are selected from a broad range of random copolymers containing ethylene and one or more monomer units of the olefins listed previously and also includes diolefin (diene) monomers such as butadiene, isoprene, and the like. Generally, the "lower" olefins and diolefins may be used, the term "lower" applying to those having up to 12 carbon atoms in the longest "chain" component of the olefin or diolefin. For example, additionally among the butadienes are 2-ethyl-1,3-butadiene, 2-propyl-1,3-butadiene, 2,3-dimethyl-1,3-butadiene; pentadienes would include 2-methyl-1,3-pentadiene, 3- or 4-methyl-1,3-pentadiene, 2,3- or 2,4-dimethyl-1,3-pentadienes; other dienes included are those such as 1,3-hexadiene, 2,4-hexadiene, 1,3-cyclohexadiene, 2-isohex-3-enyl-1,3-butadiene, 7-methyl-3-methyl-1,6-octadiene, and the like. The diene monomers, following polymerization and hydrogenation, yield "polyolefins." Preferred for use in the modifying polyolefin is a copolymer derived from ethylene and monomer units selected from propylene, 1-butene, utadiene, isoprene, 2-methyl-1-butene, and 3-methyl-1-butene, when the primary olefin of the polyolefin blend is polypropylene.

The hydrogenation (or deuteration) of the unsaturated polymers formed by polymerization of hydrocarbon dienes such as butadiene and isoprene represent one synthetic route which may be used to produce saturated hydrocarbon polymers. Polymers so prepared are included within the definition of "polyolefin" of this invention. For example, polymerization of butadiene can occur in 1,2 or 1,4 fashion and, following hydrogenation, leads to a polyolefin having polyethylethylene (PEE; or poly 1-butene) units and polyethylene (PE) units, respectively. Polymerization of isoprene can occur in 3,4; 1,4; or 1,2 fashion and, following hydrogenation, leads to a polyolefin having polyisopropylethylene (PiPE, or poly 3-methyl-1-butene) units, polyethylenepropylene (alternating) (PEP) units, and poly-1-methyl-1-ethylethylene (PMEE) units, respectively. Table 1 provides descriptions of some of these structures. Trace levels, for example, up to about one or two residual double bonds per 100 carbon atoms within the modifying polyolefin, also may be included so long as the presence of the residual double bonds does not affect the blend miscibility of the total polymer chain. In some applications, residual double bonds may offer some advantage, as will be described.

Interactions among polyolefins brought together in intimate contact, as in a polymer blender or extruder, are governed by relatively simple van der Waals interactions or forces. One might anticipate that behavior of mixtures would be closely approximated by regular solution theory. However, the long chain lengths of a given weight of polymer molecules do not allow so large a number of possible molecular arrangements as occur in the same weight composed of small molecules. The result is that there is little statistical (entropic) contribution to mixing. Polymers that previously have been shown to be miscible at the molecular level are those that have a significant exothermic (enthalpic) contribution to mixing through polar, hydrogen bonding, or ionic interactions. Resulting from these latter, relatively strong interactions, many examples of miscible blends exist, for example, blends of polyvinyl chloride with polymethyl methacrylate, of polyphenylene oxide with polystyrene, and of polyethylene oxide with polymethacrylic acid, to name only a few, and their behavior has been understood by theory and in practice (see, for example, *Polymer—Polymer Miscibility*, O. Olabisi, L. Robeson, and M. Shaw, Academic Press, Inc., 1979). On the other hand, in saturated hydrocarbons, such as those represented by polyolefins described herein, enthalpic interactions are exceedingly small, effectively not present. Accordingly, in polyolefin mixing, the contributions to the total free energy of mixing (ΔG), where $$\Delta G = \Delta H \text{ (enthalpic term)} \text{ minus } T \times \Delta S \text{ (entropic term)},$$

must be due to some other effects beyond interaction enthalpies and/or statistical (entropic) contributions.

Integral to the invention is our discovery that two or more polyolefins can be made melt-miscible if their respective segment lengths are made to be approximately equal, as previously mentioned, and as now described in more detail.

Calculation of Segment Length (SL)

The determination of the SL by calculation requires measured values for the radius of gyration (Rg) and the density (p). The best SL for these purposes is that calculated from the melt radius of gyration, such as that obtained from neutron scattering data. Examples of these data are contained in the section by G. D. Wignall in *Encyclopedia of Polymer Science and Technology*, Second Edition, Volume 10, pages 112–184, John Wiley and Sons, New York, 1987. If neutron scattering data are not available and the polymer is a random copolymer of units for which the polymer radius of gyration is known, the SL also may be calculated from the volume average geometric mean of the SL's of the polymers of the constituent monomers. Other methods for estimation of the radius of gyration such as intrinsic viscosity or size exclusion chromatography measurements in a theta solvent may be used, but are less preferred because these are not direct measurements on the polymer in the bulk. Included in the less preferred category are both theoretical methods based on a random walk or other model, and other experimental methods such as the determination of Rg from light scattering data in a theta solvent. (Light scattering Rg data are available, for example, in Section VII of *Polymer Handbook*, Third Edition, M. Kurata and Y. Tsunashima, Edited by J. Brandrup and E. H. Immergut, John Wiley and Sons, 1989.) All methods described above for estimating SL may be used to comparatively estimate, and then test by reasonable blending experimentation, those polyolefin blends which would become miscible within the bounds of the central discovery of the invention.

The density should be that based on polymer in the amorphous state. It can be measured directly or extrapolated from the melt density using the volumetric thermal expansivity.

A polyolefin SL, here SL also is represented by the term "a", may be described through its Gaussian coil radius-of-gyration, $R_g$, as mentioned previously (eq. 1)

$$R_g = a(N/6)^{1/2} \quad [1]$$

where N is the number of statistical segments per polymer chain. For proper comparison of a-values among the potential blend polyolefins, the same statistical volume should be used in determining the segment length (and N) of each polymer. Here, a statistical segment volume ("SSV," equivalent to "V" in the previous formula and in eq. 4, below) of 108 Å$^3$ was arbitrarily chosen for calculating SL, and its use led to the SL for each of several polyolefins as listed above, calculated from the reported or estimated values of $R_g$ for specific molecular weights of each polyolefin. Details for the calculation of SL are provided hereinbelow. (It will be appreciated that the absolute values determined for "a" (SL) depend on the arbitrarily chosen absolute value of the statistical segment volume (SSV). So long as consistency between the SSV and the resulting determined SL is maintained, the actual chosen value for SSV is of little consequence.)

It is possible to estimate "a" (segment length) values for random polyolefin copolymers and for the segments of block and graft copolymers. It is known from Gaussian statistics that $R_g^2$ of a random copolymer comprised of A and B segments is the volume geometric mean of $R_g^2$ values of the A and B homopolymers. Here, this relationship is extended to the a-value of an A and B copolymer, such that "a" is the value determined by eq. 2 (the "Gaussian coil approximation"):

$$a_{copolymer} = [\phi_A a_A^2 + \phi_B a_B^2]^{1/2} \quad [2]$$

where $\phi_A$ and $\phi_B$ represent the volume fraction of the A and B components in the copolymer, and $\phi_A + \phi_B = 1$. Equation [2] may be generalized to include a random copolymer comprised of any number of randomly placed monomer units, where $\Sigma\phi_i = 1$, so that:

$$a_{copolymer} = (\Sigma\phi_i a_i^2)^{1/2}$$

Using equation 2 and the determined a-values, polyolefins that are now predicted to be miscible with other polyolefins, for example with polypropylene, have been so predicted, made, blended and tested.

Calculating the Statistical Segment Length, SL, ("a")— Detailed Description

As described previously, and essential to the invention, is the discovery that two (or more) polyolefins will be miscible if their statistical segment lengths, "a", are closely matched (i.e. typically within about ±15% of one another). Application of "a" to the invention requires the calculation, estimation, or measurement of "a". The statistical segment length, "SL" or "a", can be calculated from the radius of gyration/molecular weight relationship and the density, as generally described above. The radius of gyration ($R_g$) is proportional to the square root of the molecular weight ($M_w$). The proportionality constant, C, has units of cm-g$^{-1/2}$. Values for C are in the literature, e.g. in the Wignall section of *Encyclopedia of Polymer Science and Technology* previously described. Rg, radius of gyration, is defined as the "average distance from the center of gravity of a polymer coil to the chain end" (see *Small Angle Scattering of X-Rays*, A. Guinier and G. Fournet, Wiley, New York, 1955.) The radius of gyration measured by neutron scattering gives the value most consistent with behavior in the melt appropriate to these considerations. Thus, via equation 3:

$$R_g = C \times M_w^{1/2} \quad [3]$$

Alternatively, a C can be calculated from measurement of the radius of gyration of a polymer of a particular molecular weight.

Density, p, is defined as the mass per unit volume with units of g/cc. (eq. 4):

$$p = m/V \quad [4]$$

V is defined as the statistical segment volume, in units of cc. A statistical segment volume of $1.08 \times 10^{-22}$ cc is chosen and is used.

N=number of statistical segments per polymer chain.
A=number of molecules per mole (Avogadro's number)

First, the mass, m, of a statistical segment is calculated, using V as defined, from eq. 4:

$$m = p \times V$$

Then, N, the number of statistical segments per polymer chain, is calculated.

$$N = (mass/molecule)/(mass/segment)$$

$$N = (M_w/A)(p \times V) \text{ or } (M_w/A)/(m)$$

"a" is now determined from this relationship and equation [1]:

$R_g = a \times (N/6)^{1/2}$ [1]

$C \times M_w^{1/2} = a \times \{(M_w/A)/(6 \times p \times V)\}^{1/2}$

Molecular weight cancels out of the equation, indicating that the statistical segment length, SL, or a, is independent of molecular weight.

$C = a/(6 \times A \times p \times V)^{1/2}$ $a = C \times (6 \times A \times p \times V)^{1/2}$ $a = C \times (6 \times 6.023 \times 10^{23} \times p \times 1.08 \times 10^{-22})^{1/2}$ $a = 19.76 \times C \times p^{1/2}$ [5]

When C is in units of cm-g$^{-½}$, "a" is in cm.

Example of calculation of "a" for polypropylene using equation [5]: For polypropylene at 23 degrees C $C = 3.5 \times 10^{-9}$ cm-g$^{-1/2}$ (*Encyclopedia of Polymer Science and Technology*, Second Edition, Volume 10, page 112, John Wiley and Sons, New York, 1987)

p=0.852 g/cc (extrapolated from the melt density using the volumetric thermal expansivity, *Polymer Handbook*, Third Edition, M. Kurata and Y. Tsunashima, Edited by J. Brandrup and E. H. Immergut, Section V, John Wiley and Sons, 1989.)

$a = 19.76 \times 3.5 \times 10^{-9} \times (0.852)^{1/2}$ $a = 62.0 \times 10^{-9}$ cm a = 6.20 Å

Table 1, following, summarizes several structures of polyolefins which have been prepared, by way of example, and includes several of their physical characteristics, including their determined SL ("a") values, calculated as described here.

The "a" values for several polyolefins previously listed in Table A were calculated similarly. An alternate method of calculating the statistical segment length is to use the volume average geometric mean of the statistical segment lengths of the homopolymers polymerized from their constituent monomers. For example, a copolymer of 70% PEE units and 30% PE units would have a SL calculated from eq. 2 as:

$$SL = [0.7 \times SL(PEE)^2 + 0.3 \times SL(PE)^2]^{1/2}$$
$$= [0.7 \times (5.0)^2 + 0.3 \times (8.8)^2]^{1/2}$$
$$= 6.38 \text{ Å}$$

Thus, a series of potential modifying polyolefins is determined which would be miscible with a particular primary polyolefin, for example, polypropylene, which has a so defined SL of 6.2 Å.

TABLE 1

Polyolefin Molecular Characteristics

| Polyolefin | Microstructure | p(23° C.) (g/cm$^3$)[a] | $-10^4 \partial \ln p/\partial T$ (K$^{-1}$)[c] | a(25° C.) (Å) | $10^3 \partial \ln a/\partial T$ (K$^{-1}$) |
|---|---|---|---|---|---|
| PE [poly(ethylene)] | $-[CH_2-CH_2-CH_2-CH_2]_{93}-[CH_2-CH]_7-$ with $CH_2-CH_3$ branch | 0.855[b] | 7.5 | 8.8 | −0.58 |
| PEP [polyethylene-propylene)] | $-[CH_2-CH(CH_3)-CH_2-CH_2]_{94}-[CH_2-CH]_6-$ with $CH(CH_3)_2$ branch | 0.854 | 7.0 | 7.2 | −0.58 |
| PE/PEE [poly(ethylene/ethylethylene)] | $-[CH_2-CH_2-CH_2-CH_2]_{57}-[CH_2-CH]_{43}-$ with $CH_2-CH_3$ branch | 0.862 | (6.9)[d] | 6.9 | 0 |
| PEE [poly(ethylethylene)] | $-[CH_2-CH]_{100}-$ with $CH_2-CH_3$ branch | 0.869 | 6.0 | 5.0 | 0.2 |

NOTES:
[a] Density gradient column measurements,
[b] extrapolated from above the melt temperature,
[c] as available from textural references,
[d] 0.43($\partial \ln_{PPEE}/\partial T$), +0.57($\partial \ln_{PPE}/\partial T$).

Small Angle Neutron Scattering ("SANS") Measurements

SANS experiments were conducted on copolymers and blends of the invention in order to establish, by calculation from directly measured data, the segment length of each copolymer measured, and further, to absolutely confirm the accuracy and broad utility of the above "Gaussian coil approximation" as in Eq. 2 in determining those useful blends of the invention. As described in the Examples below and summarized in Tables 2A, 2B and 2C, the SANS results for SL confirm within experimental error the SL values obtained by previous estimates shown above.

Molecular Weight Relationships to Polyolefin Blend Miscibility

Although average molecular weight (e.g. weight average molecular weight, Mw) has no effect on the determination of the SL itself, generally it has been found that the closer SL-X matches SL-1, the more probable is melt-miscibility in the blend and the greater is the tolerance to higher Mw of the blend components. Based upon the practical (finite) molecular weights of polymers, the Mw of either the primary or modifying polyolefin may influence the effective "matching ranges" of SL. Generally stated, the higher the Mw, for example at first thought above about 100,000 daltons, the closer SL-X should "match" SL-1 to achieve blend miscibility. In its broadest applicability, effective SL-X "matching" occurs within about ±15 % of SL-1. It was originally thought that above about 200,000 Mw, probably to at least 400,000 Mw, that SL-X preferably should fall within the range of ±5% of SL-1 for optimum polyolefin blend miscibility. Thus, a melt-miscible polyolefin blend would result when the matching segment length of the modifying polyolefin was within about 95% to about 105% of the primary polyolefin segment length and either of the primary and modifying polyolefin had a weight average molecular weight of up to about 400,000 daltons.

It has been possible to directly measure and to more distinctly specify the effective SL ranges dependent on molecular weight of blend components. The SANS experiments introduced above and from which additional results are described below have confirmed the existence of some dependency by blend miscibility on molecular weight of the components of the blend. Furthermore, it has been shown that the Mw ranges may be larger (extending to higher Mw) than those originally thought, particularly depending on the volume fraction of the polyolefin blend components. (It is noted that volume fraction is equivalent to weight percentage when blend components have essentially identical densities.) An appreciation of the results from the following SANS experiments is facilitated first by the following discussion of known miscibility relationships.

Relationships that predict miscibility in linear homopolymer blends as a function of degree of polymerization (N; here, the term "degree of polymerization" is equivalent to the previously defined "number of statistical segments per polymer chain" based on a statistical segment volume of 108 cubic Angstroms), volume fraction (φ; also called "composition fraction" in the literature), and interaction parameter (χ), are known (e.g. the article by Bates, F. S., "Polymer—Polymer Phase Behavior", *Science*, Vol. 251, pp. 898–905, 1991). For example, equations 10 and 11 of that article, stated immediately below, are used to calculate the critical composition fraction ($\phi_c$) and critical interaction parameter ($\chi_c$) of a mixture of "A" and "B" homopolymers as follows. Here, $N_A$ and $N_B$ refer to the degree of polymerization of the A and B homopolymers, respectively. The $\phi_c$ here represents the critical volume fraction for the "B" component:

$$\phi_c = \frac{N_A^{1/2}}{N_A^{1/2} + N_B^{1/2}}$$

$$\chi_c = \frac{(N_A^{1/2} + N_B^{1/2})^2}{2 N_A N_B}$$

It is known that when χ is less than $\chi_c$, miscibility is always achieved. For the special case of a "symmetric" mixture in which the A and B homopolymers have the same degree of polymerization (i.e. $N=N_A=N_B$), the equation for the critical interaction parameter reduces to:

$\chi_c = 2/N$

This equation can be rearranged to allow a general determination of the critical degree of polymerization, $N_c$, of a mixture A and B homopolymers below which $N_c$ miscibility is always achieved:

$N_c = 2/\chi_c$

Multiplying this equation by the mass of a statistical segment, m, provides the critical molecular weight, $M_{w,c}$, of a mixture of A and B homopolymers (of equal N) below which molecular weight miscibility is always achieved, which can be determined with SANS measurements:

$M_{w,c} = mN_c = 2m/\chi_c$.

These equations result from known classical statistical mechanical theory and, via use of the critical interaction parameter, $\chi_c$, allow one to estimate limits of miscibility at volume fractions other than "critical (50/50) volume fractions," so-called "off-critical volume fractions." From the SANS results of the χ and $\chi_c$ for 50/50 volume fractions of selected miscible copolymers of the invention (Table 2C), and from the SANS and optical results showing miscibility of some of the inventive blends (Table 11) based on percent differences in blend component segment lengths, estimates of molecular weight (Mw) effects on polyolefin blend miscibility have been made.

First, from Table 2C, the SANS data show that the measured χ is smaller than the critical Chi, $\chi_c$, and thus all blends listed in that table are characterized as miscible homogeneous blends.

Second, and more specific to molecular weight effects, the SANS results in conjunction with the above mathematical relationships used to describe polymer blend miscibility, also have provided a quantitative estimate for the magnitude of χ as a function of the ratio of SL ("a") values in polyolefin mixtures, and also provide a link to the effects of molecular weight. Recent theory [Bates, F. S. and Fredrickson, G. H., "Conformational Asymmetry and Polymer—Polymer Thermodynamics", *Macromolecules*, 27, pp. 1065–1067 (1994)] has shown for equal molecular weight (i.e., equal N) components, and with volume fraction of the components equal to 0.5, that:

$$\chi_\varepsilon = C \left[ \frac{1-\varepsilon}{1+\varepsilon} \right]^2$$

(note that here, "C" is the term used in the above Bates/Frederickson paper; it is not the "C" term used in Equation 3);

and epsilon, $\epsilon$, is defined by the following equation to be:

$$\varepsilon = \left(\frac{a_A}{a_B}\right)^2 \geq 1$$

and is determined by the ratio of the SLs (the "a's"). Using the "a" values obtained for PEP29 (Example 2) and PEE70 (Example 1; for this combination, $\epsilon$ equals 1.3), and the isotope-corrected $\chi$ parameter measured for the mixture (i.e., $\chi$=0.0030), we obtain C=0.176. Thus, $$\chi_\varepsilon = 0.176 \left[\frac{1-\varepsilon}{1+\varepsilon}\right]^2$$

These estimates indicate that for a 5% difference in the statistical segment lengths (i.e., a SL "matching" range from 95 to 105%; or $\epsilon$=1.10) that $\chi_\epsilon \approx 0.00042$. Together with the critical condition $N_c = 2/\chi_\epsilon$ this yields an upper degree of polymerization for miscibility of $N_c$=4800. Based on a segment volume of 108 Å$^3$, and using a representative polyolefin density of $\rho$=0.86 g/cc at 25° C., $N_c$=4800 corresponds to a molecular weight of 268,000 g/mole. Below this molecular weight, and assuming there are no other contributions to the excess free energy of mixing (e.g., unfavorable volume changes on mixing or chain end effects for smaller polymers, e.g. polymers with Mw less that about 5,000), polyolefin mixtures with less than a 5% difference in SLs are miscible. This was indeed supported by certain blending experiment results, summarized below.

It will be appreciated that miscibility is more favorable for "off-critical blend volume fractions" (i.e. those volume, or weight, fractions other than 0.5). For example, it is anticipated that a 5 weight % homopolymer blend ($\phi_B$ of about 0.05) of equal molecular weight A and B homopolymers will remain miscible at molecular weights roughly twice that at the critical point [Bates, 1991 reference, Fig. 3 therein]. Hence, a 5% difference in the SLs of such a polyolefin blend (again, SL's "matching" within 95 to 105%) will be miscible up to 2×268,000 g/mole=536,000 g/mole. This point is quite significant since many practical applications of the enhanced miscibility of a blend will be in the form of copolymer components of the blend (e.g. a modifying polyolefin) that may be used at low concentration such as from about 2 to about 20% of blend weight.

Calculations were performed to predict miscibility in partially miscible, critical and off-critical polymer blends containing 50% to 98% of a polyolefin A (representing either a primary or modifying polyolefin) having molecular weights of 300,000 daltons and 600,000 daltons, mixed with 2% to 50% of a polyolefin B (similarly representing either a modifying or primary polyolefin) having a variable molecular weight. Such calculations, as described above, require knowledge of the blend volume fraction, ($\phi$=$\phi_B$), number of statistical segments per polymer chain, $N_A$ and $N_B$, and the $\chi$ parameter. In general, one calculates the free energy per polymer segment $\Delta G_m$ associated with mixing Gaussian coil polymer chains on an incompressible ($\phi_A$+$\phi_B$=1) lattice, $$\frac{\Delta G_m}{k_B T} = \frac{\phi_A}{N_A}\ln\phi_A + \frac{(1-\phi_A)}{N_B}\ln(1-\phi_A) + \phi_A(1-\phi_A)\chi$$

in which $k_B$=1.38×10$^{-23}$ J/K is the Boltzmann constant, and T is absolute temperature (K). Blend miscibility is predicted when $\Delta G_m$ attains a minimum value at $\phi(\Delta G_{m,min}) \geq \phi_B$; that is, when the volume fraction of additive polymer B is less than the critical volume fraction that results in an immiscible two-phase blend. Hence, the maximum value of $N_B$ of (e.g. a modifying) polyolefin that is miscible and stable at volume fraction $\phi_B$ in a (e.g. primary) polyolefin having $N_A$ segments for a given value of $\chi$ occurs when $\phi(\Delta G_{m,min})=\phi_B$. The maximum molecular weight (MW$_B$=55.83 g/mole×N$_B$) of miscible polyolefin B was so obtained for several volume fractions ($\phi_B$=0.02, 0.05, 0.10, 0.20, and 0.50) and for several appropriate values of $\chi$ (0.00042, 0.00159, and 0.00340; these Chi values correspond to "% $\Delta a$" values at ±5, 10, and 15%'s "matching" ranges, respectively. Here, $$\% \Delta a = \left[\frac{a_A - a_B}{a_B}\right] \times 100\% \quad (a_A > a_B)$$

and this expression is a convenient means for calculating certain relationships, using the several indicated "matching" ranges of segment lengths.) The calculated $\chi$ was obtained from the above relationships for $\chi_\epsilon$, $\epsilon$, and % $\Delta a$. The following sample calculations demonstrate the method of estimating polyolefin molecular weight effects on miscibility of blends of the invention.

Sample Calculation 1: The maximum molecular weight of a polyolefin B having $a_B$=6.0 Å, that is miscible in a polyolefin A having $a_A$=6.6 Å and MW$_A$=300,000 g/mole, is calculated for which the volume fraction of B, $\phi_B$, is less than or equal to 0.10. The value of % $\Delta a$ in this sample is 10%, and $\epsilon$ is 1.21, so that $\chi \approx \chi_\epsilon$=0.00159 according to the above equations. It can also be calculated from $\phi_A + \phi_B = 1$ that $\phi_A$ is 0.90, and from MW$_A$=55.83 g/mole×N$_A$ that $N_A$ is about 5373. Substitution of these numerical values with $N_B$ at about 1182 into the previous equation for $\Delta G_m/k_B T$ causes the minimum value of $\Delta G_m/k_B T$ (−6.935×10$^{-5}$) with respect to $\phi_A$ to coincide with $\phi_A$=0.90, or $\phi_B$=0.10. Using a value of $N_B$ slightly smaller than 1182 causes the minimum in $\Delta G_m/k_B T$ with respect to $\phi_A$ to coincide with $\phi_A$<0.90, or $\phi_B$>0.10. Likewise, using a value of $N_B$ slightly larger than 1182 causes the minimum in $\Delta G_m/k_B T$ with respect to $\phi_A$ to coincide with $\phi_A$>0.90, or $\phi_B$<0.10, and thus an $N_B$ of 1182 is the calculated maximum degree of polymerization that is miscible with A. In terms of absolute average molecular weight of B, this is calculated as 55.83 g/mole×1182=66,000 g/mole; this is the maximum molecular weight of a polyolefin B that is miscible up to a volume fraction of 0.10 in a polyolefin A having a molecular weight of 300,000 g/mole, between which % $\Delta a$ is 10%.

Sample calculation 2: The maximum molecular weight of, for example, a modifying polyolefin (B) having $a_B$=6.0 Å, that is miscible in, for example, a primary polyolefin (A) having $a_A$=6.3 Å and MW$_A$=600,000 g/mole, is calculated for which the volume fraction of the modifying B, $\phi_B$, is less than or equal to 0.05. The value of % $\Delta a$ in this case is 5%, and $\epsilon$ is 1.10, so that $\chi \approx \chi_\epsilon$=0.00042 according to the above equations. It can also be calculated from $\phi_A + \phi_B = 1$ that $\phi_A$ is 0.95, and from MW$_A$=55.83 g/mole×N$_A$ that $N_A$ is about 10,750. Substitution of these numerical values with $N_B$ at about 6900 into the previous equation for $\Delta G_m/k_B T$ causes the minimum value of $\Delta G_m/k_B T$(−6.291×10$^{-6}$) with respect to $\phi_A$ to coincide with $\phi_A$=0.95, or $\phi_B$=0.05. Using a value of $N_B$ slightly smaller than 6900 causes the minimum in $\Delta G_m/k_B T$ with respect to $\phi_A$ to coincide with $\phi_A$ <0.90, or $\phi_B$>0.10. Likewise, using a value of $N_B$ slightly larger than 6900 causes the minimum in $\Delta G_m/k_B T$ with respect to $\phi_A$ to coincide with $\phi_A$>0.90, or $\phi_B$<0.10. Thus MW$_B$=55.83 g/mole×6900≈385,000 g/mole, and is the maximum molecular weight of a modifying polyolefin that is miscible up to a volume fraction of 0.05 in a primary polyolefin having a molecular weight of 600,000 g/mole, between which % Δa is 5%.

The maximum molecular weights for miscibility of polyolefin B blended with a primary polyolefin A of 300,000 and 600,000 molecular weights, for purposes of exemplification, were so determined and are given in Tables B and C, respectively. The data from Table B also are depicted in graphical form in FIG. 1.

TABLE B

Maximum Mw of Polyolefin B versus %Δa Having Miscibility with a Polyolefin A of Mw 300,000 at the Limit of the Δa Range Max. Additive Mw for Additive Volume Fractions $\phi_B$

| %Δa | $\phi_B = 0.02$ | $\phi_B = 0.05$ | $\phi_B = 0.10$ | $\phi_B = 0.20$ | $\phi_B = 0.50$ |
|---|---|---|---|---|---|
| 5 | 730,000 | 550,000 | 430,000 | 310,000 | 240,000 |
| 10 | 120,000 | 89,000 | 66,000 | 42,000 | 32,000 |
| 15 | 53,000 | 39,000 | 28,000 | 18,000 | 12,000 |

TABLE C

Maximum Mw of Polyolefin B versus %Δa Having Miscibility with a Polyolefin A of Mw 600,000 at the Limit of the Δa Range Max. Additive MW (g/mole) for Additive Volume Fractions $\phi_B$

| %Δa | $\phi_B = 0.02$ | $\phi_B = 0.05$ | $\phi_B = 0.10$ | $\phi_B = 0.20$ | $\phi_B = 0.50$ |
|---|---|---|---|---|---|
| 5 | 510,000 | 385,000 | 290,000 | 190,000 | 160,000 |
| 10 | 110,000 | 82,000 | 61,000 | 39,000 | 27,000 |
| 15 | 51,000 | 37,000 | 27,000 | 17,000 | 11,000 |

Thus, it is quantitatively shown how the tolerance to blend miscibility of the maximum molecular weight of a modifying polyolefin increases as the segment length percentage difference (from the segment length of a primary polyolefin) decreases. Quantifiable Mw ranges of miscible modifying polyolefins exist, and are dependent on the % SL difference (% Δa) and the Mw of the primary polyolefin. It is also clear that, in the limit as % Δa approaches zero, the tolerance to blend miscibility of the molecular weight of polyolefins of the invention continues to increase. For example, extrapolation from FIG. 1 shows that for a primary polyolefin up to 300,000 Mw the Mw of a modifying polyolefin can be as high as about 1,200,000 at %. segment length differences approaching zero and at weight fractions about 2% or less. Mw's of either the primary or modifying polyolefin up to at least 1,000,000 daltons fall within limits of the invention. Thus there is provided for the primary and modifying polyolefins previously defined having segment lengths matched to within ±15%, a melt-miscible polyolefin blend wherein the primary polyolefin has a Mw up to about 300,000 and the modifying polyolefin has a weight fraction of from about 0.2 to about 50 weight percent of the blend weight and a Mw up to about 1,000,000 daltons. Similarly, because of the effective interchangeability of "primary" and "modifying" polyolefins of the invention, there is provided a melt-miscible blend wherein the modifying polyolefin has a Mw up to about 300,000 and the primary polyolefin has a weight fraction of from about 0.2 to about 50 weight percent of the blend weight and a Mw up to about 1,000,000 daltons. When the primary or modifying polyolefin has a Mw up to about 600,000, the modifying or primary polyolefin, respectively, may have a weight fraction of from about 0.2 to about 50 weight percent and a Mw, respectively, up to about 750,000.

One approach to selecting a modifying polyolefin composition is to estimate the formation of, for example, a two-component copolymer from two monomers, one of which monomers provides a polymer with SL higher than that of the primary polyolefin and the other of which monomer provides a polymer with SL lower than that of the primary polyolefin. The composition that produces a SL match with that of the primary polyolefin can be determined by equation 2:

$$a_{copolymer} = [\phi_A a_A^2 + \phi_B a_B^2]^{1/2} \quad [2]$$

$$a_{copolymer}^2 = \phi_A a_A^2 + \phi_B a_B^2$$

$$\phi_B = 1 - \phi_A$$

$$a_{copolymer}^2 = \phi_A a_A^2 + (1-\phi_A) a_B^2$$

$$a_{copolymer}^2 - a_B^2 = \phi_A (a_A^2 - a_B^2)$$

$$\phi_A = (a_{copolymer}^2 - a_B^2)/(a_A^2 - a_B^2)$$

For example, the fraction PEE in a PEE-PE copolymer that matches the SL of polypropylene (6.2) can be determined as follows:

$$\phi_A = (a_{copolymer}^2 - a_B^2)/(a_A^2 - a_B^2)$$

$$\phi_{PEE} = (6.2^2 - 8.8^2)/(5^2 - 8.8^2), \text{ or } \phi_{PEE} = 0.74$$

Copolymers of two monomers thus have a unique solution to an exact match, although it will be appreciated that a range of compositions will give rise to a useful SL if the range of compositions fall within about 15%, preferably within 10%, more preferably within 5%, of the SL of the primary polyolefin. For example, the modifying polyolefin copolymers compositions ranging from about 66 to about 82% PEE {i.e. poly(1-butene)} and from about 18 to about 34% PE have SL's within about 5 absolute % of the polypropylene SL (that range being 5.9–6.5). When the Mw of the modifying polymer is up to about 730,000 daltons, melt miscibility is achieved at low volume fractions, i.e. about 0.02 (about 2 weight %) when the primary polyolefin is polypropylene and has a Mw of about 300,000. Similarly, by way of example, for the 10 absolute % range of matched SL's, a melt-miscible polyolefin blend results when the modifying polyolefin is a poly(ethylene/1-butene) copolymer derived from units comprising from about 12 to about 41 weight % ethylene and from about 59 to about 88 weight % 1-butene, and has a weight average molecular weight of up to about 120,000 daltons. As shown previously, primary pqlyolefins having Mw lower than the exemplified 300,000 will tolerate higher Mw's of modifying polyolefin; similarly, SL's matching closer than 5 % also will tolerate higher Mw's and broader ranges of composition than those exemplified immediately above.

When three or more monomers are involved in making a modifying olefin copolymer (terpolymer or higher copolymers) there is more than one composition that gives a match. In this case, calculation is similar to the two-monomer calculation only slightly more complicated; determination of a series of compositions reveals which compositions have the approximately matching SL. The existence of more than one composition with a SL match to the primary polyolefin offers an advantage in that a choice can be made based upon other copolymer characteristics, for example, the glass temperature or the degree of crystallinity, appropriate to the particular application. Thus, for example, at a ±10% segment length differential, a melt-miscible polyolefin blend results from PP having up to about 300,000 Mw and a modifying polyolefin at a volume fraction of 0.10 where the modifying polyolefin is a poly{ethylene-propylene (EP)/isopropylethylene (iPE)/ methylethylethylene (MEE)} random copolymer derived from units comprising from about 0 to about 81 weight % ethylene-propylene, from about 16 to about 62 weight % iso-propylethylene, and from about 0 to about 84 weight % methylethylethylene, and having a weight average molecular weight of up to about 66,000 daltons. Where the Mw of the modifying polyolefin is up to about 430,000 daltons, the SL-X preferably should be within 95–105% of the absolute value of the SL for the PP having Mw of up to about 300,000, and a preferred composition of the modifying polyolefin is a poly{ethylene-propylene (EP)/ isopropylethylene (iPE)/methylethylethylene (MEE)} random copolymer derived from units comprising from about 0 to about 69 weight % ethylene-propylene, from about 23 to about 52 weight % isopropylethylene, and from about 0 to about 72 weight % methylethylethylene.

It is thus shown that copolymers that meet the SL criteria for melt-miscibility in a polyolefin blend are those of the determined composition composed of one or more monomers having polymer of an SL greater than that of the primary polyolefin and one or more monomers having polymer of an SL less than that of the primary polyolefin.

For polypropylene (PP), for example, the monomers that have a polymer SL greater than that of the PP include ethylene and ethylene-propylene alternating. Those that have a polymer SL less than that of PP include, for example, poly-1-butene; other simple polyolefins also have lower SL's. One highly preferred polyolefin blend, for example, is one wherein the primary polyolefin is polypropylene and the modifying polyolefin is derived from ethylene, 1-butene, butadiene, or isoprene.

Possible copolymers that can be prepared for use in the invention are those made by hydrogenation of a polybutadiene projected to have a "correct" (i.e. calculated) 1,2 addition amount, or by hydrogenation of isoprene with a projected "correct" ratio of 1,2- and 1,4- and 3,4-addition as described below. Also possible are combinations, determined from the criteria and calculations described, of random copolymers made from ethylene and one or more other monomers such as 1-butene, 1-hexene, 1-octene, 4-methyl-1-pentene, 1-pentene, and the like. Many combinations are possible, so long as the respective SL's of the respective polyolefins comprising the blend are "matched" in accordance with the invention.

The discovery of the controlling factor in polyolefin miscibility allows one to design materials for a variety of purposes. Some of the benefits and uses of the invention are exemplified, using polypropylene as an example of a "primary" polyolefin. A "primary" polyolefin also may be viewed as one of the polyolefins of the prospective melt-miscible blend which typically, although not exclusively, is used in larger amount relative to other, "modifying" polyolefins. One or more of either of the primary or the modifying polyolefins may be used in forming the melt miscible blend of the invention.

Cycle time in polypropylene fabrication processes may be improved when polypropylene is blended with one or more modifying polyolefins that fit this invention's criteria of miscibility. It is known that isotactic polypropylene is a crystalline polymer. Crystallinity contributes to many desirable features of polypropylene; for example, it contributes to the modulus and strength and confers to PP a high use temperature. However, polypropylene crystallinity also produces some drawbacks. One of the drawbacks is that the crystallization process must occur before a fabricated article may be removed from the process and handled. Typically this crystallization process is slow, thus lengthening process cycles. An additive that increases the temperature at which crystallization occurs as the polypropylene is cooled from the melt, generally will decrease cycle time. The miscible polyolefins of this invention do indeed increase the crystallization temperature and therefore shorten the process cycle. Specifically, those modifying polyolefins which increase the rate of PP crystallization are those polyolefins having relatively low molecular weight. For example, modifying polyolefins having a calculated SL of between 5.9 and 6.5 (about ±5%) at a volume fraction of 0.02 and that have a molecular weight of less than about 730,000 daltons function effectively in increasing the crystallization temperatures of polypropylene having 300,000 Mw. In general, the maximum effect on cycle time reduction occurs with a miscible modifying polyolefin level of less than about 20%, preferably less than about 12%, and most preferably less than about 8%, although, in some blends, levels over 20 wt. % can be used.

Polypropylene parts fabricated by injection molding, such as toys, automobile bumpers, wheel wells, fluid reservoirs, appliance housings, protective fan grills, washing machine spin tubs and agitators, pails, tool handles, waste containers, baskets, dunnage trays, and the like, benefit economically from a reduction in cycle time. This benefit also is seen in thermoformed parts (e.g. suitcases, type-writer housings, refrigerator liners, shower surrounds, dishwasher tubs, and the like) and blow molded parts (e.g. containers for food packaging and other uses, automobile fuel tanks, machine housings, and the like.)

Another disadvantage brought on by the presence of crystallinity in a polyolefin, or in some blends of crystalline polyolefins, is in the effect of crystallinity on clarity of the blend. The existence of the crystalline phase in large (i.e. visible light-affecting) spherulites leads to inferior transparency; generally the larger the spherulite relative to the wave length of transmitted light, the larger is the effect on light scattering with a concomitant reduction of transmitted light. Thus, reducing spherulite size is usually desirable for increased light transmittance. "Nucleators" and/or "clarifiers" for polypropylene exist, but these generally are either crystalline polymers or acids or acid salts. A nucleator that is miscible in the melt would be highly beneficial. Clarity can be either "transmittance" or "contact" clarity. Transmitted clarity refers to light transmitted through a sample. It can be measured by standard luminous transmittance (LT) or haze measurements. Contact clarity refers to the visibility of an object touching an opposite surface of the blend. Measurement is usually a qualitative evaluation of how clearly a printed message can be seen through the film. The miscible modifying polyolefins of this invention generally increase the clarity of the primary olefin, for example PP, in the blend. Levels of modifying polyolefins of from about 0.2 to about 10%, preferably from about 0.2 to about 5%, are generally sufficient to provide a measurable clarity improvement, although higher levels can be used. Clarity often is of benefit, for example, in food packaging, blister packaging, fluid reservoirs, coextruded containers, novelty items, tape, and the like. Thus, an injection molded, extruded, extruded cast film, extruded blown film, blow molded, or thermoformed article made from the melt-miscible polyolefin blend of the invention will have useful and improved properties over the properties of the individual components of the blend. Articles so formed and having one or more improved properties include cast and blown films, tapes, containers, sheet, bottles, and tubs.

Due to its crystallinity and resulting relatively sharp melting point, polypropylene suffers from other process difficulties. Below its melting point, PP is essentially unprocessable, while a few degrees above the melting point, PP possesses such low melt strength that it cannot be processed easily in commercial equipment. Operations that would benefit from an increase in melt strength include, for example, thermoforming, blow molding, and blown or cast film extrusion. Appropriate miscible modifying polyolefins for this use in blends with PP include those with an SL within ±10%, preferably ±5%, of the PP SL (6.2). Molecular weights above about 300,000 are preferred, but the amount of improvement depends on the relative molecular weight of the polypropylene and the miscible polyolefin. One of the advantages of the miscible modifying polyolefins as melt strength improvers is that they, unlike high molecular weight polypropylene, often are not subject to degradation via oxidative Beta scission. In addition to its benefit in fabricating thermoformed and blow-molded articles mentioned above, increased melt strength is important in foamed polypropylene articles such as wood substitute, sound insulation, food containers, cushioning materials, and flotation devices.

Impact strength also may be increased in the blends of the invention in comparison to the impact strength of the primary polyolefins alone. For example, polypropylene is generally considered in the art to be a "tough" polyolefin, but PP suffers from "notch sensitivity," that is, a flaw or a crack ("notch") will initiate failure at relatively lower energy than at the failure energy of many other thermoplastic materials. Modifiers are available in the art which improve the impact strength of PP, and these are low glass temperature polyolefins such as PE or ethylene-propylene (EP) copolymers. One of the disadvantages of these low Tg polyolefins is that, while they improve impact strength, they tend to reduce clarity of the blend. Many of the miscible modifying polyolefins of this invention improve the impact strength and are still capable of maintaining or improving the clarity. Appropriate miscible modifying polyolefins for impact modification having increased clarity are those with an SL within about 10%, preferably within about 5%, of that of PP SL and further having a glass temperature of less than about −10° C. Levels of the modifying polyolefins of the invention that give a significant improvement in impact strength and good clarity are in the range of from about 1 to about 25 wt. % of the blend weight, and preferably from about 3 to about 15%, although higher levels also can be used. Many of the polypropylene articles used in automotive, appliance, packaging, construction, consumer, and business machine parts benefit from this increased impact strength in their blends.

In addition to the above listed benefits, the modifying polyolefin also may function as a "carrier" to bring other, less or non-miscible groups into intimate contact with the polyolefin. Groups that can be brought into intimate contact with a primary polyolefin, which in so doing become compatibilized or are dispersed beneficially, include other polyolefins, small functional groups, and polar polymers. The groups so compatibilized can function to enhance impact strength, cycle time, clarity, or melt strength or to provide other benefits to their blends. Some of these embodiments are described hereinbelow.

Polyolefin block copolymers composed of a melt-miscible modifying polyolefin block and an immiscible polyolefin block may be useful as primary polyolefin modifiers. Polyolefin block copolymers are conveniently synthesized, for example, by known sequential anionic techniques. In addition to conferring increased clarity, melt strength, production rate, and impact strength, modifying polyolefin block copolymer of the invention can be used as a compatibilizer to produce a more intimate mixture of two polyolefins. For example, addition of a tailored block polyolefin (e.g. the PEP-PEP29 of Example 5) to a blend of a polypropylene and an ethylene-propylene copolymer rubber, results in improved rubber dispersion and a better balance of impact strength and clarity. More preferred, due to further enhanced miscibility, is the blend wherein the polyolefin rubber is one that is melt-miscible with the polyolefin of a second block. Thus, two combinations of polyolefin blends having block copolymers are contemplated. One has at least one melt-miscible polyolefin blend phase and a second has two separate (i.e. non-mixing, or essentially incompatible) blend phases. These are described as follows.

The first is a polyolefin blend having at least one melt-miscible polyolefin blend phase, the polyolefin blend comprising:

a) a primary polyolefin (preferably from about 60 to about 99.8 weight percent, based on the blend weight) selected from polypropylene or ethylene/alpha-olefin copolymer having a defined segment length (SL-1) within a range of absolute value of from about 4.2 to about 8.8 Angstroms; and b) at least one modifying polyolefin (preferably from about 0.2 to about 40 weight percent, based on the blend weight) comprising a block copolymer having at least two blocks, each block derived from ethylene and one or more monomer units selected from propylene, 1-butene, butadiene, 1-pentene, 1-hexene, 1-octene, isoprene, 2-methyl-1-butene, 3-methyl-1-butene, 4-methyl-1-pentene, or mixtures thereof, wherein each block of the modifying polyolefin has a weight average molecular weight of at least 20,000 daltons, and wherein the melt-miscible polyolefin blend phase comprises at least one block having a block segment length (SL-B) of from about 85% to about 115% of the SL-1, and further wherein the SL-1 range and the absolute value of SL-1 and SL-B are determined from an arbitrarily chosen common segment volume of $1.08 \times 10^{-22}$ cubic centimeters.

Furthermore, one or more of the blocks may comprise a terminal functional fragment derived from a reactive terminal molecule, described more fully below, selected from carbon dioxide, ethylene oxide, propylene oxide, succinic anhydride, maleic anhydride, glutaric anyhdride, epichlorohydrin, caprolactone, or allyl halide.

A second combination of block copolymers is a two-phase polyolefin blend comprising two separate melt-miscible polyolefin bleiid phases, the two-phase polyolefin blend comprising:

a) a primary polyolefin blend (preferably from about 60 to about 99.8 weight percent, based on the two-phase polyolefin blend weight) comprising polypropylene and an immiscible polyolefin selected from polyethylene or an ethylene/alpha-olefin copolymer, each polyolefin of the primary polyolefin blend having a segment length (SL-1 and SL-2, respectively) within a range of absolute value of from about 4.2 to about 8.8 Angstroms; and b) at least one modifying polyolefin (preferably from about 0.2 to about 40 weight percent, based on the two-phase polyolefin blend weight) comprising a block copolymer having at least two blocks, each block derived from ethylene and one or more monomer units selected from propylene, 1-butene, butadiene, 1-pentene, 1-hexene, 1-octene, isoprene, 2-methyl-1-butene, 3-methyl-1-butene, 4-methyl-1-pentene, or mixtures thereof, wherein each of the blocks of the modifying polyolefin has a weight average molecular weight of at least 20,000 daltons, and wherein a first melt-miscible polyolefin blend phase comprises:

i. a first block of the modifying polyolefin, the first block having a first block segment length (SL-B1) of from about 85% to about 115% of SL-1, and ii. the primary polyolefin having the segment length, SL-1;

and wherein a second melt-miscible polyolefin blend phase comprises:

i. a second block of the modifying polyolefin, the second block having a second block segment length (SL-B2) of from about 85% to about 115% of the SL-2, and ii. the primary polyolefin having the segment length, SL-2;

and further wherein the SL-1 and SL-2 range and the absolute value of the SL-1, SL-2, SL-B1, and SL-B2, respectively, is determined from an arbitrarily chosen common segment volume of $1.08 \times 10^{-22}$ cubic centimeters, and wherein the first and second melt-miscible polyolefin phases are separate phases within the two-phase polyolefin blend.

The two-phase polyolefin blend also may benefit from the presence of a terminal functional fragment on at least one of the blocks of the modifying polyolefin, that is where at least one of the modifying polyolefin blocks further comprises a terminal functional fragment derived from a reactive terminal molecule selected from carbon dioxide, ethylene oxide, propylene oxide, succinic anhydride, maleic anhydride, glutaric anhdride, epichlorohydrin, caprolactone, or allyl halide.

A useful example of the two phase polyolefin blend described above is wherein the immiscible ethylene/alpha-olefin copolymer is an ethylene/propylene copolymer having from about 40 to about 70 weight percent ethylene and from about 30 to about 60 weight percent propylene, based on the weight of the ethylene/propylene copolymer. Another is wherein the immiscible ethylene/alpha-olefin copolymer having from about 70 to about 98 weight percent ethylene and about 2 to about 30 percent of an alpha-olefin monomer, based on the weight of the ethylene/alpha-olefin copolymer. An especially preferred two phase polyolefin blend, due to the low cost of polyethylene, is wherein the immiscible ethylene/alpha-olefin copolymer has an ethylene content over 90 weight percent, from about 90 to about 98 percent.

Additionally contemplated are modifying polyolefin copolymers containing a block of a melt-miscible polyolefin and a "segment" of a polar polymer. Here, the segment of a polar polymer may be a homo- or co-polymer chain of monomer(s) polymerized to a Mw of at least 1,000 daltons by any polymerization means, such as by free radical graft or block polymerization, anionic polymerization, or other polymerization methods known in the art. A monomer that can be polymerized onto a "living" polydiene segment, for example, is appropriate for use in forming a second, polar polymer segment. A monomer that can be grafted or block polymerized on the preformed polyolefin block by free radical methods also is appropriate for this use. Segments of polar polymers and copolymers include units of, for example, dimethylsiloxane, styrene and substituted styrenes such as α-methyl styrene, p-methyl styrene, p-methoxy styrene, vinylmesitylene, p-dimethylaminostyrene, p-chlorostyrene, p-bromostyrene, other vinylaromatics such as vinyl naphthalene, vinylbiphenyl, vinyl pyridine, isopropenylnaphthalene; N-vinyl pyrrolidone; $C_1$–$C_{18}$ alkyl acrylic or methacrylic (i.e. (meth)acrylic) esters, particularly the $C_1$–$C_8$ alkyl acrylic esters, for example, methyl (meth) acrylate, ethyl (meth)acrylate, t-butyl (meth)acrylate, n-butyl (meth)acrylate, 2-ethylhexyl (meth)acrylate, octade-cyl (meth)acrylate, and the like; phenyl or benzyl methacrylate; dimethylaminoethyl methacrylate; acrylonitrile and methacrylonitrile, or mixtures of these monomers. Thus, there is provided a polyolefin blend having a melt-miscible polyolefin blend phase, the polyolefin blend comprising:

a) a primary polyolefin (preferably from about 60 to about 99.8 weight percent, based on the blend weight) selected from polypropylene or ethylene/alpha-olefin copolymer having a segment length (SL-1) within a range of absolute value of from about 4.2 to about 8.8 Angstroms; and b) at least one modifying polyolefin (preferably from about 0.2 to about 40 weight percent, based on the blend weight) comprising a block/segment copolymer comprising:

i. a block (preferably from about 40 to about 99 weight %, based on the block/segment copolymer weight) derived from ethylene and one or more monomer units selected from propylene, 1-butene, butadiene, 1-pentene, 1-hexene, 1-octene, isoprene, 2-methyl-1-butene, 3-methyl-1-butene, 4-methyl-1-pentene, or mixtures thereof, and ii. at least one segment (preferably from about 1 to about 60 weight %, based on the block/segment copolymer weight) comprising a polar polymer having a weight average molecular weight of at least 1,000 daltons, the polar polymer segment derived from monomer units selected from styrene, substituted styrene, vinyl pyridine, N-vinyl pyrrolidone, a C1-C8 alkyl acrylic ester, a $C_1$–$C_{18}$ alkyl methacrylic ester, phenyl methacrylate, benzyl methacrylate, acrylonitrile, methacrylonitrile, or mixtures thereof;

wherein the block has a segment length (SL-B) of from about 85% to about 115% of the SL-1, and wherein an absolute value of the SL-1 and the SL-B is determined from a chosen common segment volume of $1.08 \times 10^{-22}$ cubic centimeters, and further wherein the block/segment copolymer has a weight average molecular weight of at least 20,000 daltons.

The modifying melt-miscible polyolefins of this invention also can be "functionalized" to confer further utility on the polyolefin. Functionalization can occur, for example, by terminating an anionic polymerization process with a reactive (i.e. functional) group, or by reaction of a polydiene or hydrogenated polydiene with an olefin through a known "-ene" or a grafting reaction. For example, diene anionic polymerizations typically are terminated with a proton donor to produce the H-terminated polydiene. Termination with other molecules to give co-functional and αω-difunctionalities (the latter in the case of a dianionic polymer) are also possible. The preparation of such polymers, also known as telechelic polymers or telomers, is known. Reactive terminal molecules which provide a terminal functional fragment include, for example, carbon dioxide (providing as the terminal functional fragment a carboxylate or carboxylic acid), cyclic ethers such as ethylene oxide, propylene oxide (hydroxyl functionality), anhydrides such as succinic, maleic and glutaric anhydride (carboxylate or carboxylic acid functionality), epichlorohydrin (epoxy functionality), lactones such as propiolactone or caprolactone (hydroxyl functionality), and allyl halides such as allyl bromide (vinyl functionality). Other terminal fragment groups such as thiol, amine (primary and tertiary) and ammonium salts can be incorporated via appropriate reactive terminating agents; other reactive agents include ethylene sulfide, thietanes, oxazolidine diones, hexamethylcyclotrisiloxane, phosphoranes, and the like. These functional blocks can be made by sequential block polymerization followed by hydrogenation of a diene precursor polymer. In one particular embodiment where there is a segment of a polar polymer, it will be appreciated that the segment polar polymer would not likely be formed via a subsequent anionic polymerization, a route conveniently possible when the the terminal fragment is not present, but more likely would be formed by a subsequent free radical graft or block polymerization reaction on the hydrogenated, functionalized first segment. However prepared, the resulting saturated segmented block copolymers, as described, are useful, for example, as surface modifiers for the primary polyolefins. Thus there is further provided the above described polyolefin blend having at least one melt-miscible polyolefin blend phase, wherein the block component of the modifying polyolefin block/segment copolymer comprises a terminal functional fragment derived from a reactive terminal molecule selected from carbon dioxide, ethylene oxide, succinic anhydride, glutaric anyhdride, epichlorohydrin, caprolactone, or allyl halide. This embodiment provides a primary polyolefin, particularly polypropylene, with increased surface polarity for increased paintability and bondability and increased adhesion to glass. Applications include reinforced parts such as stamped automobile fenders and equipment housings and painted automotive bumpers.

It is a further embodiment of the invention that the segment polar polymer of the modifying polyolefin may contain reactive monomer units in addition to those polar monomer units already described from which the segment is derived. Thus a polyolefin blend having a melt-miscible polyolefin blend phase is provided wherein the derived polar polymer segment of the modifying polyolefin further comprises a reactive monomer unit selected from acrylic acid, methacrylic acid, crotonic acid, itaconic acid, maleic acid, maleic anhydride, fumaric acid, hydroxyethyl methacrylate, hydroxypropyl methacrylate, tertiarybutylaminoethyl methacrylate, dimethylaminoethyl methacrylate, glycidyl methacrylate, methacryloxypropyl triethoxysilane, acryloxyproprionic acid, caprolactone, or mixtures thereof.

A modifying polyolefin containing one or more of the described reactive monomer units is contemplated to provide further compatibilization, likely via chemical reaction, with polar and other reactive polymers, and thereby confer heretofore unknown property enhancement to the polyolefin blends of the invention. Similarly, a polyolefin blend containing the terminally functionalized polyolefin block (i.e. the first component of the block/segment copolymer), described above, and the segment polar polymer containing one or more reactive monomer units, also may benefit the polyolefin blends contemplated by the invention. Thus there is also provided the polyolefin blend having a melt-miscible polyolefin blend phase having both the above-described functionalized polar polymer segment and also the block of the modifying polyolefin further comprising a terminal functional fragment derived from a reactive terminal molecule selected from carbon dioxide, ethylene oxide, propylene oxide, succinic anhydride, maleic anhydride, glutaric anyhdride, epichlorohydrin, caprolactone, or allyl halide.

Reactive groups enable the miscible modifying polyolefin to perform additional functions. Some of these functions are to provide polarity or hydrophilicity at the surface of, for example, PP, to increase printability and paintability of the blend containing PP, mentioned previously, but also to increase the adhesion of the polypropylene blend toward polar or inorganic substrates such as adhesives, ethylene-vinyl alcohol copolymer, aluminum, and glass, and to provide antistatic properties to an article made therefrom. Another benefit that reactive groups may provide is the potential for "reactive compatibilization." For example, functionally reactive groups can react with an appropriate complementary reactive group on another polymer or other molecule, such as on poly(MMA), polyamide (nylon), ethylene-vinyl alcohol copolymer, polyester, polycarbonate, or mixtures of these polymers, to produce a compatibilized blend of, for example, polypropylene with them. The resulting blends then combine the advantage of chemical resistance, lower density, and processability of PP with the modulus and use temperature of the polar polymer. It will be appreciated that a critical requirement in all of the special embodiments described is the achievement of a degree of compatibilization, often of miscibility, with the one or more components of the blends via the approximate matching of SL's between the primary polyolefin and the modifying polyolefin. The following additional embodiments exemplifying and describe polyolefin blends of the invention having at least one melt-miscible polyolefin phase and additional polar or functionalized components conferring further advantage to their resulting blends.

One of these embodiments contemplates a blend, typically of two phases, comprising a melt-miscible polyolefin blend phase having a modifying polyolefin comprising any one of the block/segment copolymers previously described, and further comprising from about 2 to about 80 weight percent, based on the polyolefin blend weight, of a polar polymer selected from a $C_1$–$C_8$ alkyl acrylic ester polymer, a $C_1$–$C_{18}$ alkyl methacrylic ester polymer, an alkyl acrylic/methacrylic copolymer derived from a combination of two or more of a $C_1$–$C_8$ alkyl acrylic ester and a $C_1$–$C_{18}$ alkyl methacrylic ester, poly(vinyl chloride), poly(ethylene terephthalate), poly(butylene terephthalate), an acrylonitrile/butadiene/styrene polymer, a styrene/acrylonitrile polymer, polycarbonate, polystyrene, poly(ethylene oxide), poly (caprolactone), poly(phenylene ether), or mixtures thereof, and further wherein the polar polymer is compatible with the segment polar polymer of the block/segment copolymer.

Another embodiment contemplates that useful polyolefin blends result which contain from about 2 to about 80 weight percent, based on the polyolefin blend weight, of one or more of these immediately above-described polar polymers in admixture with the previously described polyolefin blend having a melt miscible polyolefin blend phase resulting from the derived polar polymer segment of the modifying polyolefin, which polar polymer segment comprises the previously described reactive monomer units, i.e. those selected from acrylic acid, methacrylic acid, crotonic acid, itaconic acid, maleic acid, maleic anhydride, fumaric acid, hydroxyethyl methacrylate, hydroxypropyl methacrylate, tertiarybutylaminoethyl methacrylate, dimethylaminoethyl methacrylate, glycidyl methacrylate, methacryloxypropyl triethoxysilane, acryloxyproprionic acid, caprolactone, or mixtures thereof, and wherein the polar polymer is compatible with the polar polymer segment of the block/segment copolymer. Useful blends also are contemplated which are composed identically to those just described, but further comprising on the polyolefin block of the modifying polyolefin the terminal functional fragments derived from reactive terminal molecules, i.e. those selected from carbon dioxide, ethylene oxide, propylene oxide, succinic anhydride, maleic anhydride, glutaric anyhdride, epichlorohydrin, caprolactone, or allyl halide, further wherein the polar polymer is compatible with the polar polymer segment of the block/segment copolymer.

Another embodiment contemplates a blend, typically of two phases, comprising a melt miscible polyolefin phase and further on which derived segment polar polymer are the reactive monomer units defined previously, wherein the polyolefin blend further comprises from about 2 to about 60 weight %, based on the weight of the blend, of a reactive polymer selected from poly(methyl methacrylate), nylon, polyester, polycarbonate, ethylene/vinyl alcohol copolymer, polyethylene oxide, polycaprolactone, polyethyleneimine, or mixtures thereof.

The "functionalized" polyolefin blends just described, that is, the blends having in the modifying polyolefin a block/segment polar polymer, a block/segment polar polymer having a copolymerized reactive monomer unit, a block having a terminal functional fragment, or combinations of these, and further allowing for another polar polymer or a reactive polymer in the polyolefin blend containing the functional modifying copolymers, just as for the broadest form of the melt-miscible blends of the invention, find utility in injection molded, blow molded, extruded, or thermoformed articles having generally improved appearance, clarity, or mechanical properties, as described previously. Particularly useful articles of the invention include blown and cast films, tapes, containers, and sheet.

It should be understood that combinations of primary and modifying polyolefins in a wide range of amounts can be accomplished by following the teachings herein. For example, the primary polyolefin can be present in a blend in an amount of about 0.1–99.9 wt-%, as can the modifying polyolefin, based on the total weight of the blend. Preferred ranges are described above.

Any of the miscible modifying polyolefins described above with respect to melt-miscible blends can be used to modify the surface of the primary polyolefin, as long as the segment lengths are appropriately matched as described above. Surface-modification can be carried out either by melt mixing the primary and modifying polyolefins as described above, by coating the surface of the primary polyolefin using a variety of art recognized techniques, e.g., solution coating, spray coating, etc., or by a combination of melt mixing and coating. In this way, the amount of modifying polyolefin at the surface of the primary polyolefin can be controlled and adjusted for the desired result. For example, using the surface coating techniques, the outer surface of the primary polyolefin can be coated with a layer of 100% modifying polyolefin, thereby "priming" the surface of the primary polyolefin. In this way, a blend of a primary and modifying polyolefin is formed wherein the modifying polyolefin is concentrated at the surface of the primary polyolefin. Thus, the terms "miscible polyolefin blend" or simply "polyolefin blend" or "blend" as used herein encompass both melt-miscible blends, i.e., those blends produced by melt mixing (whether the modifying polyolefin is concentrated at the surface or homogenously mixed throughout the blend once solidified), as well as surface-coated, i.e., "primed," blends.

Thus, the modifying polyolefin can be used to improve the surface printability and paintability properties of the primary polyolefin either by melt mixing, surface coating, or both, with the modifying polyolefin. They can also be used to increase the adhesion of the primary polyolefin toward other polyolefins, or toward polar or inorganic substrates. Furthermore, they can be used to provide antistatic properties to the surface of the primary polyolefin. For paintability and printability, the modifying polyolefin preferably contains functional groups and/or polar polymer segments.

It should be understood that the coating techniques will be known to one of skill in the art. Preferably, they involve heating the article comprising the primary polyolefin to form a layer of melted primary polyolefin at the surface, which is then coated with the modifying polyolefin, which can be dissolved or dispersed in a solvent, for example.

The following non-limiting examples illustrate properties, means of preparing, combinations, uses and advantages of the polyolefin blends of the invention.

EXAMPLES

General Descriptions and Procedures

Preparation of Modifying Polyolefins Four model polyolefins were prepared by hydrogenation (or deuteration) of diene polymer precursors to give the following polyolefins: polyethylene (PE), poly(ethylene-propylene) (PEP), poly (ethylene/ethylethylene) (PE/PEE) (a random copolymer), and poly(ethylethylene) (PEE). The exact microstructures and pertinent physical parameters characterizing these polymers are listed in Table 1, and detailed procedures for their preparation are provided below. Generally, these polyolefins were prepared by catalytically hydrogenating anionically polymerized polydienes (isoprene and butadiene) on a calcium carbonate supported palladium catalyst by known methods. Use of appropriate polar additives for complexing cations, as described more fully below, during the polymerization stage provided control over the product microstructures, which were verified by $^1H$ and $^{13}C$ NMR analysis. Diblock copolymers were prepared through the sequential addition of monomers and modifiers to the reaction medium. All percents are by weight, unless otherwise indicated.

PEP, PE/PEE, and PEE homopolymer densities were determined at 23° C. using known density gradient column techniques. The density of polyethylene has been reported based on extrapolation from above the melting temperature; the PE melting point occurs at 108° C., when prepared by hydrogenating polybutadiene containing 7% of 1,2 units and 93% 1,4 units.

Evaluation of Modifying Polyolefins: The number average molecular weight ($M_n$) reported for each modifying polymer prepared via the diene/hydrogenation route was that calculated from the stoichiometry of the reaction, that is, from the amount of initiator (sec-butyl lithium) and diene monomer used:
Molecular weight (grams/mole)=(Grams of diene reacted)/(moles of initiator). In addition, gel permeation chromatography (GPC), calibrated with polystyrene molecular weight standards, was used to check for overall molecular weight range and polydispersity ($M_w/M_n$). GPC measurements confirmed a low polydispersity (<1.06) and the expected molecular weight range, thus verifying that polymerization and hydrogenation (or deuteration) reactions proceeded well and the reaction stoichiometry yielded the expected average molecular weight (where $M_w$ thus was shown to approximately equal $M_n$, within 10%). $M_w$ generally was used for molecular weight comparison purposes.

Blend Formulations A general purpose propylene homopolymer (Himont Pro-Fax™ 6523, mfr=4, Molecular Weight of about 300,000, herein designated "HP-6523"), was melt blended with the hydrogenated diene modifying polyolefins. Two antioxidants, a hindered phenol (tris(4-t-butyl-3-hydroxy-2,6-dimethylbenzyl)-s-triazine-2,4,6-(1H, 3H,5H)-trione, Cyanox™ 1790, American Cyanamid Co.) and a phosphite (tris(2,4-di-tert-butylphenyl)phosphite, Irgafos™ 168, Ciba Geigy Corp.) were each added to all blends at a level of 0.25 wt. % on the blend weight. The modifying polyolefins were tested over the range of 0.4% to 10 wt. %, weights based on the weight of the blend. Controls were IP-6523 polypropylene pellets used directly as received and as polypropylene plaques that had been passed through the blending and pressing procedures. From the differential scanning calorimetry (DSC, described below) of HP-6523 pellets, the crystallization temperature was found to be 109° C., with 49% crystallinity measured from the area under the reheat melting peak (102.3 joules/gram). The polypropylene used in the melt blends also was passed through the below-described melt-blend process for a comparison with its original properties. Antioxidants were included. The "melt-blend control" was run three times using HP-6523. The three DSC traces showed crystallization temperatures of 109, 109, and 107° C. and crystallinities of 49%, 50%, and 50%, respectively, essentially identical to the non-melted control. The three notched Izod averages were 21, 23, and 18 J/m.

Melt Blend Preparation Blends of approximately 60 grams were prepared on an electric mill with two 7.5 cm diameter×18 cm length rolls. The mill was heated to 195° C. The polypropylene and antioxidants were placed on the mill. Once the polypropylene had melted, the hydrogenated polydiene additive was added to the rolling bank. To ease handling, blends which tended to stick to the rolls were surrounded by a previously prepared film of about 1 gram of HP-6523 polypropylene and the polypropylene film weight was included in the total weight of the polypropylene charge. Once the material fluxed, mixing was continued for 5 minutes.

Plaque Fabrication The hot melt was taken directly from the mill and placed in a 3×125×125 mm (0.125×5×5 inch) mold in a hot press at 195° C. and 4.1 MPa (600 psi). Pressure was applied for 3 minutes. The mold was transferred to a cold press and pressure was applied for 3 minutes. The plaque was removed from the mold and cut into parts for testing.

Impact Strength Samples were cut and a notch was milled into the test pieces. The notched Izod impact strength was measured according to ASTM Method D256.

Clarity and Haze Measurement The clarity of the melt on the mill and of the resulting plaque were noted. The plaques were rated in comparison to the HP-6523 control plaques. They were rated for "see-through" clarity by comparing how clearly light could be seen through a plaque of 3 mm thickness (the control HP-6523 clarity rating=0). Plaques also were rated for "contact" clarity by comparing how well a printed page in contact with the 3 mm plaque could be read through the plaque (the control HP-6523 clarity rating=0). The modified polypropylene plaques were rated from +4 (superior) to −4 (poor). Small samples were cut from the plaque and pressed at 195 degrees C to a thickness of 20 mils for a sample for quantitative measurement of thickness. Haze and Luminous Transmittance (LT, ASTM Method D-1003) were measured.

Differential Scanning Calorimetry (DSC) A sample of about 20 mg was evaluated in a DSC (7 Series Thermal Analysis System, Perkin Elmer Co.) The sample was heated at 208° C. per minute to 200° C. It was held at this temperature for 5 minutes. The sample was then cooled at 10 degrees per minute and the crystallization exotherm was recorded. The values reported are the temperatures at which maximum crystallization occurs. The sample was then reheated at 20° C. per minute (giving a "reheat curve") and the melting endotherm was recorded. From the reheat curve the melting endotherm temperature and energy were determined. The per cent polypropylene crystallinity was estimated from the energy of crystallization as a fraction of the known 209 J/g for 100% crystalline polypropylene and is corrected for the modifying polyolefin content.

Small Angle Neutron Scattering Studies (General) Polymer blend miscibility and radius of gyration ($R_g$) were determined experimentally using small angle neutron scattering (SANS) experiments, the procedures for which are known (e.g. the Wignall section of *Encyclopedia of Polymer Science and Engineering*, previously described). The 30 meter SANS instrument located at Oak Ridge National Laboratory (ORNL) was used for measurement; a description of this instrument and the procedures used to obtain the desired data are given by Bates and Wignall in "Absolute Calibration of Small-Angle Neutron Scattering Data", *J. Appl. Cryst.* 20, pp. 28–40, 1987. Generally, one obtains the Gaussian coil radius of gyration ($R_g$) of a deuterium-containing homopolymer "A" blended with a non-deuterium-containing homopolymer "A" by applying the methods described by Wignall (reference above; equation 38) to the SANS data. Likewise, one obtains the degree of polymer blend miscibility (enumerated by the interaction parameter, $\chi$) by applying Wignall equation 42 to SANS data obtained from a blend of "A" and "B" homopolymers in which one of the homopolymers contains deuterium. Detailed SANS results for polymers of the invention are provided below.

Detailed Preparative Methods and Results

Example 1

Synthesis of "PEE-70" a Random Polyethylethylene/polyethylene copolymer

A random copolymer of 70% 1,2-polybutadiene and 30% 1,4-polybutadiene repeat units, having a weight-average molecular weight (Mw) of approximately 25,000 g/mol, was synthesized by reacting 49.2 grams of butadiene with 1.97 mmols of sec-butyllithium in 1.5 liters of cyclohexane and 0.338 cc of tetramethylethylenediamine (TMEDA) at 38° C. The reaction was stopped after twelve hours by terminating the "living chains" with 2 cc methanol. Approximately 49 grams polymer were recovered after removing the cyclohexane by rotary evaporation. GPC showed that $M_w/M_n$= 1.05. The butadiene polymer was then saturated with deuterium by vigorously stirring 22 grams of the polymer in 1.5 liters cyclohexane with 50 grams calcium carbonate-supported palladium metal catalyst under 600 psi deuterium gas at 92° C. for 15 hours. (Hydrogen saturation was carried out under similar conditions.) The saturated polymer was recovered by removing the catalyst particles with a 0.20 micron pore diameter filter and removing the cyclohexane by rotary evaporation. Complete saturation was shown by $^1$H NMR spectroscopy of the product polyethylene polymer ("PEE-70"), using standard procedures. GPC of PEE-70 also indicated that no degradation in molecular weight had occurred during this step. The resulting microstructure in Tables 1 and 2A was determined by $^1$H NMR spectroscopy of the precursor diene polymer using standard procedures. As a result, the PEE-70 polymer has approximately 70% poly(ethyl-ethylene,"PEE"; or "1-butene") and 30% polyethylene ("PE") repeat units (randomly placed) with $M_w \approx 25,000$ daltons and $M_w/M_n \approx 1.05$. DSC (heating rate of 5° C./min) indicated that the glass transition temperature (Tg) of PEE-70 is −45° C. The calculated SL ("a") for "PEE-70" is about 6.38 (Table 2A).

Example 2

Synthesis of "PEP-29", a Random Copolymer of Poly(ethylene/propylene/Poly(isopropylethylene)/Poly(methylethylethylene).

A random copolymer of about 29% 1,4-polyisoprene, 61% 3,4-polyisoprene, and 10% 1,2-polyisoprene repeat units with a weight-average molecular weight ($M_w$) of about 25,000 g/mol was synthesized by reacting 47.4 grams of isoprene with 1.90 mmols of sec-butyllithium in 1.5 liters of cyclohexane and 0.326 cc tetramethyl-ethylenediamine (TMEDA) at 38° C. The reaction was stopped after ten hours by terminating the "living chains" with 2 cc methanol. Approximately 47 grams polymer were recovered (about 100% yield) after removing the cyclohexane by rotary evaporation. GPC indicated that $M_w/M_n \approx 1.05$. This polyisoprene was then saturated with deuterium by vigorously stirring 22 grams of polymer in 1.4 liters cyclohexane with 51 grams calcium carbonate-supported palladium metal catalyst under 580 psi deuterium gas at 94° C. for 18 hours. (Hydrogen saturation was carried out under similar conditions.) The saturated polymer was recovered by removing the catalyst particles with a 0.20 micron pore diameter filter and removing the cyclohexane by rotary evaporation. Complete saturation (>98%) was evidenced by $^1$H NMR spectroscopy of the product polymer ("PEP-29"; "H" or "D" refer to hydrogen or deuterium saturated copolymer, respectively) using standard procedures. GPC of PEP-29 also indicated that no degradation in molecular weight had occurred during this step. The resulting microstructure indicated in Table 2 was determined by $^1$H NMR spectroscopy of the precursor diene polymer using standard procedures. As a result, the PEP-29 polymer has about 29% poly(ethylene-propylene)("PEP"); 61% poly(isopropylethylene) or "PiPE," or poly(3-methyl-1-butene); and 10% poly(methylethylethylene) or "PMEE," or poly(2-methyl-1-butene) repeat units (randomly placed) with $M_w$ about 25,000 daltons and $M_w/M_n \approx 1.05$. DSC (heating rate 5° C./min) indicated that the Tg of PEP-29 is -7° C. The calculated SL ("a") is 6.19 (Table 2A).

Example 3
Synthesis of "PEE-70" with Mw about 100,000.

A random copolymer of ≈70% 1,2-polybutadiene and 30% 1,4-polybutadiene repeat units, similar to Example 1 but with a weight-average molecular weight (Mw) of about 100,000 daltons was synthesized by reacting 65.4 grams of butadiene with 0.651 mmols of sec-butyl lithium in 1.5 liters of cyclohexane and 0.112 cc TMEDA at 38–39° C. The reaction was stopped after twelve hours by terminating the "living chains" with 2 cc methanol. Approximately 600 cc (456 grams) of the polymer solution was kept aside for hydrogenation. The balance (545 grams) of the polymer solution was precipitated in 2.5 liters methanol and 35.2 grams polymer were recovered after further vacuum drying. This gave essentially 100% monomer polymerization yield (64.7 grams) when the hydrogenation solution is taken into account. GPC indicated that $M_w/M_n$ was about 1.05. The butadiene polymer in solution was saturated with hydrogen by vigorous stirring with an additional 900 cc cyclohexane and 72.3 grams palladium metal catalyst supported on calcium carbonate (Strem Chemical) under 480 psi hydrogen gas at 75° C. for 23 hours. The saturated polymer was recovered (27.5 grams) by removing the catalyst particles with a 0.20 micron pore diameter filter and precipitating in 2 liters methanol/0.5 liters isopropanol followed by vacuum drying. Complete saturation was evidenced by $^1$H NMR spectroscopy of the product polymer ("100K PEE-70") using standard procedures. GPC of 100K PEE-70 also indicated that no degradation in molecular weight had occurred during hydrogenation. The resulting microstructure was determined by $^1$H NMR spectroscopy of the precursor butadiene polymer using standard procedures as in Example 1 and the determined SL("a") for "PEE-70" of 100 K Mw was about 6.38 (Table 2A), as in Example 1.

Example 4
Synthesis of a PEP Polymer, A Poly(ethylene/propylene) Random Copolymer with Mw about 23,000 ("23K PEP").

A polymer consisting of about 95% 1,4-polyisoprene and 5% 3,4-polyisoprene repeat units (randomly placed) with Mw of ≈23,000 g/mol was synthesized by reacting 41.1 grams isoprene with 1.81 mmols of sec-butyl lithium in 2.0 liters cyclohexane at 40° C. The reaction was stopped after three hours by terminating the "living chains" with 2 cc methanol. The cyclohexane was removed by rotary evaporation and 41.0 grams (=100% yield) remained. GPC indicated that $M_w/M_n$ was 1.05 and that the molecular weight was determined by the polymerization stoichiometry. Hydrogenation to yield "23K PEP" was accomplished by mixing 21.2 grams of the 23K polyisoprene with 1.5 liters cyclohexane and 50.0 grams catalyst (see above) under 200–600 psi hydrogen gas at 91° C. for 17 hours. The saturated polymer was recovered (20.2 grams) by removing the catalyst particles with a 0.20 micron pore diameter filter and rotary evaporation of the cyclohexane followed by vacuum drying. Complete saturation was evidenced by $^1$H NMR spectroscopy using standard procedures. The resulting microstructure of the "23K PEP", Table 1 was determined by $^1$H NMR spectroscopy of the polyisoprene precursor using standard procedures. GPC of 23K PEP also indicated that no degradation in molecular weight had occurred during the hydrogenation. The SL ("a") of 23K PEP is determined to be 7.2 (based on its 94/6 microstructure, Table 1, compared to an "a" of 7.3 for a pure, i.e. 100%, ethylene/propylene random copolymer).

Example 5
Synthesis of a "PEP-PEP29 Diblock Copolymer"A 50/50 by weight A-B diblock copolymer consisting of a 50,000 g/mol A-block having about 95% 1,4 polyisoprene and 5% 3,4-polyisoprene units (a "PEP" block) and a 50,000 g/mol B-block having about 29% 1,4 polyisoprene and 61% 3,4-polyisoprene units, and 10% 1,2-polyisoprene repeat units (a PEP-29 block) was synthesized as follows: The A-block was first synthesized by reacting 57.4 grams of isoprene with 1.14 mmols of sec-butyl lithium in 1.5 liters of cyclohexane at 40° C., similar to the method described for "PFP", Example 4. After three hours (sufficient time for >99% conversion) 0.196 cc TMEDA and 57.0 grams isoprene were added to the reaction at 38° C. to polymerize the B-block, similar to the method described for "PEP-29", Example 2. The reaction was stopped after twelve hours by terminating the "living chains" with 2 cc methanol. Approximately 310 grams of the polymer solution was kept aside for hydrogenation. The balance (734 grams) of the polymer solution was precipitated in 2.5 liters methanol and 78.5 grams dried polymer were recovered.

This gave essentially 99% yield (114 grams) of polymerized monomer when the hydrogenation solution is taken into account. GPC indicated that $M_w/M_n \approx 1.05$ based upon polystyrene calibration standards. The diblock copolymer solution was then saturated with hydrogen by vigorous stirring with an additional 1.0 liters cyclohexane and 75.8 grams palladium catalyst (as in Ex.4) under 335–450 psi hydrogen gas at 79° C. for 22.5 hours. The saturated polymer was recovered (29.9 grams) by removing the catalyst particles with a 0.20 micron pore diameter filter and precipitating in 2 liters methanol/0.5 liters isopropanol followed by vacuum drying. Complete saturation was evidenced by $^1$H NMR spectroscopy of the product polymer ("PEP—PEP29") using standard procedures. GPC of PEP—PEP29 also indicated that no degradation in molecular weight had occurred during hydrogenation. The microstructure of the saturated diblock copolymer was estimated from the similar polymerization conditions for the 23K PEP and 25K PEP-29 polymers given above. As a result, the 50 wt % A-block contains 95% poly(ethylene-propylene) and 5% poly(isopropylethylene) repeat units (randomly placed), and the 50 wt % B-block contains ≈29% poly(ethylene-propylene), 61% poly(isopropylethylene, and 10% poly(methylethylethylene) ("$_p$MEE") repeat unit, the block micro structures as presented in Table 1 and 2A. SL is determined to be 7.2 for the A block and 6.19 for the B block.

Example 6

Synthesis of a Polystyrene-PEP29 Diblock ("Segmented") Copolymer

A 50/50 by weight diblock copolymer containing a 50,000 g/mole segment of polystyrene and a 50,000 g/mole block of mixed-microstructure polyisoprene (ca. 29% 1,4-addition, 61% 3,4-addition, 10% 1,2-addition; i.e. PEP-29, Example 2) was synthesized by anionic polymerization. Approximately 100 grams styrene monomer was purified by stirring over about 10 grams $CaH_2$ overnight, distilling twice onto about 2 grams dibutylmagnesium (with stirring for two hours at 0° C. after each distillation), then distilling 47.1 grams styrene into a monomer buret. Approximately 100 grams isoprene monomer was purified by distilling onto about 2 grams dibutylmagnesium, stirring for 2 hours at 0° C., distilling twice onto about 2 grams n-butyllithium (with stirring for two hours at 0° C. after each distillation), then distilling 46.7 grams isoprene into a monomer buret. Approximately 1.5 liters cyclohexane solvent was freshly distilled from polystyryllithium into a 3 liter glass reactor under an argon atmosphere, followed by 0.95 millimoles s-butyllithium initiator and all 47.1 g of the distilled styrene monomer. After the styrene block was polymerized at 38±2° C. for 4 hours (sufficient time for >99% conversion of the styrene), 1.08 millimoles of TMEDA was added to the reactor followed by all of the distilled isoprene monomer. After polymerization of the polyisoprene block at 38±1° C. for about 18 hours, the resulting polystyrene-polyisoprene block copolymer was terminated with 2 ml degassed methanol, and precipitated into a mixture of 2 liters methanol/0.5 liters isopropanol. Approximately 93.5 grams polymer was recovered (>99% yield) after further vacuum drying overnight at room temperature. Gel permeation chromatography showed that the polymer had a narrow molecular weight distribution ($M_w/M_n$<1.10). The microstructure of the polyisoprene block is expected to be identical to that of the PEP29 precursor of Example 2, based upon the similar reaction conditions of its preparation.

Selective hydrogenation of the polyisoprene block of the above "PS-PI" (polystyrene-polyisoprene) diblock copolymer can be accomplished as follows:
1. To an argon-gas purged Pyrex glass reactor add:
    a. 20 grams PS-PI diblock polymer dissolved in 650 cc toluene (air-free);
    b. 0.70 grams Wilkinson's Catalyst (Tris(triphenylphosphine)-rhodium(I)chloride, 99.99% Aldrich Chemical Co.) dissolved in 350 cc toluene (air-free);
2. Pressurize to 20 PSI with Hydrogen;
3. Stir vigorously at room temperature for ca. 12 hours;
4. Vent hydrogen and extract polymer-rich phase with excess methanol at room temperature and dry in vacuum oven. An additional precipitation step from 5% pentane solution may be necessary to remove residual catalyst.

Thus, a segmented copolymer having a second segment polar polymer of styrene and an approximately 50 weight percent first segment saturated hydrocarbon having an SL ("a") of 6.19 (that of "PEP-29", Table 2A) is prepared.

Example 7

Synthesis of a PMMA-PEP-29 Diblock (Segmented) Copolymer

A diblock copolymer containing about 32 wt. % of a 32,000 g/mol block (segment) of poly(methyl methacrylate) (PMMA) and about 68 wt. % of a 68,000 g/mol block (segment) of PEP-29 as previously described can be synthesized by a two-step anionic polymerization of isoprene in benzene with TMEDA followed by methyl methacrylate (MMA) in benzene/tetrahydrofuran. Methyl methacrylate is purified by stirring over $CaH_2$ overnight and distilling onto triethylaluminum (TEA1). Isoprene is purified as described in Example 6. Benzene is purified by distillation from polystyryl lithium. Tetrahydrofuran (THF) is purified by distillation from sodium metal and benzophenone. The 68,000 g/mol mixed-microstructure polyisoprene block (analogous to that of Example 2) is polymerized to +99% conversion by vigorously stirring at 38° C. for 12 hours the following in a argon-purged one liter glass reactor: 160 cc benzene, 0.390 mmols sec-butyllithium, 23.4 mmols TMEDA, and 26.7 g isoprene. The polyisoprenyl anion is then reacted with 1,1-diphenylethylene (DPE) by injecting a 5:1 molar ratio of DPE:sec-butyllithium into the reactor (1.95 mmols). (Only one DPE molecule adds to each polyisoprenyl anion chain, and the DPE is necessary to reduce side reactions during the initiation of the MMA.) Methyl methacrylate is then polymerized by adding 450 cc THF to the reactor, cooling to −78° C., and then adding 12.3 grams MMA. After one hour the MMA is completely polymerized (>98%) and the "living" diblock copolymer is terminated by injecting 2 cc degassed methanol. The intermediate polyMMA-polyisoprene ("PMMA-PI") diblock copolymer is recovered by precipitation in excess methanol followed by vacuum drying.

To selectively hydrogenate the polyisoprene block of the above PMMA-PI diblock copolymer to give a PMMA-PEP29 diblock polymer, catalytic schemes such as those described previously are sufficient. Depending on total molecular weight, 100% saturation of the PI double bonds, although preferable, is not necessary for the resulting PEP29 block to be miscible with polypropylene (for example, a residual 5% random unsaturation will only change "a" slightly without significant consequence to the overall miscibility with polypropylene). Known methods of hydrogenation may be applied to saturate the PMMA-PI diblock polymer. Thus, a segmented copolymer having a methyl methacrylate segment and an approximately 68 weight percent first segment saturated hydrocarbon having a SL ("a") of 6.19 (that of PEP-29, Table 2A) is so prepared.

Example 8

Synthesis of a Carboxylated PEP29

A carboxylic acid terminated "PEP-29" can be synthesized by the hydrogenation of poly(isoprene)carboxylate (prepared as in Example 7, but terminated with $CO_2$) with a homogeneous rhodium catalyst such as $[P(C_6H_5)_3]_3RhCl$ or $[P(C_6H_5)]_3RhHCO$ for low molecular weights, or with heterogeneous catalysts such as $Pd/CaCO_3$, described above. Thus, a PEP-29 polymer having a carboxylic acid end group and a SL ("a") value of 6.19 is so prepared.

Example 9

Synthesis of PEP Having Mw About 50,000

A 50,000 PEP was prepared by a procedure identical to that of Example 4 except for the quantities of isoprene (85.5 g) and sec-butyl lithium initiator (1.71 mmoles) used.

Example 10
Synthesis of a Polystyrene-PEE70 ("Segmented") Block Copolymer A PS-PEE70 diblock copolymer with weight average molecular weight of approximately 100,000 g/mole and 50% by weight as a polystyrene (PS) block segment was synthesized by anionic polymerization followed by homogeneous catalytic hydrogenation. Here PS refers to a segment of atactic polystyrene and PEE70 denotes a random copolymer that is obtained upon fully saturating a mixed microstructure polybutadiene copolymer consisting of 70% 1,2 and 30% 1,4 additions.

The anionic polymerization reaction was carried out in a three liter reactor that contains o-ring sealed fittings and a gas tight rubber septaem for the injection of initiator and chemical modifiers. Cyclohexane was stirred for at least one week over sulfuric acid and then introduced to a distillation unit that was isolated under purified argon. 10 ml of styrene and 8 ml of nBuLi (1.6 M) were injected into the cyclohexane, the mixture was then brought to reflux. Development of a deep orange color indicated purity. Styrene monomer was distilled under vacuum, once from calcium hydride and twice from dibutyl magnesium, and then transferred to a gas-tight buret. Butadiene monomer was vacuum distilled from dibutyl magnesium and then twice from nBuLi, and isolated in a gas-tight buret. Both monomer burets were mounted on the reactor and then the combined reactor/distillation unit isolated under purified argon. Two liters of cyclohexane were distilled into the reactor and maintained at 40° C. 0.906 ml of 1.225 sec BuLi was added via gas tight syringe and stirred using a magnetically driven stir bar. Subsequently, 55.5 grams of styrene were added to the reactor and allowed to react for 3 hours while maintaining the temperature at 40° C. After this period of styrene polymerization, 0.191 ml of degassed tetramethylethylenediamine (TMEDA), were injected into the reactor followed by the addition of 55.5 grams of butadiene monomer. Polymerization of butadiene proceeded at 40° C. and lasted 15 hours and 40 min, after which 3 ml of degassed methanol were injected, thereby terminating the reaction.

The PS-polybutadiene (PS-PB) product was isolated by precipitation in methanol followed by drying for several days in a vacuum oven at room temperature. Within experimental error (10.5%) a yield of 100% was obtained.

Gel permeation chromatography (GPC) characterization of the PS-PB diblock copolymer revealed a single essentially monodisperse elution peak ($M_w/M_n<1.1$) indicating that the product was at least 98% diblock copolymer with less than 2% homopolymer. Proton NMR analysis of the resonances associated with the 1,2 and 1,4 microstructures confirmed that 68+5% of the polybutadiene block consisted of 1,2 additions (consistent with the target value of 70% 1,2 additions). Based on the yield and GPC results the stoichiometric molecular weight is 100,000 g/mole.

A homogeneous catalytic hydrogenation reaction was performed on the PS-PB diblock copolymer. 15.6 g of PS-PB were added to 100 ml of anhydrous toluene in a flask held in a glove box under purified argon. To a second flask were charged 0.807 g chlorotris (triphenylphosphine) rhodium, 0.809 g triphenylphosphin rhodium, 0.809 g triphenylphosphine, and 400 ml anhydrous toluene, also in the glove box. The contents of these two flasks were allowed to dissolve overnight, and then each of the contents was introduced into a 0.5 liter high pressure reactor. The reactor was pressurized to 100 psi with hydrogen, heated and maintained at 100° C. for 7.5 hours while being stirred. The hydrogenated polymer was precipitated by adding methanol to the reaction solution. Three successive precipitations from chloroform using methanol as the non-solvent were used to remove residual catalyst. The product was then dried at room temperature in a vacuum oven. Proton NMR confirmed that more than 99.5% of the double bonds in the polybutadiene block had been saturated, without affecting the polystyrene block. The determined SL ("a") is 6.38 for the PEE-70 block.

Table 2A summarizes some of the molecular characteristics of Examples 1–10.

TABLE 2A

Examples 1–10, Microstructure and Segment Length

| Example | Microstructure (see also Table 1) | Determined SL ("a") [1] |
|---|---|---|
| 1. PEE70 (Mw 25K) | $(PEE)_{70}/(PE)_{30}$ | 6.38 |
| | | 6.4 (Note 2) |
| 2. PEP29 (Mw 25K) | $(PEP)_{29}/(PiPE)_{61}/$ | 6.19 |
| | $(PMEE)_{10}$ | 5.6 (Note 2) |
| | | 5.7 ± 0.2 (Note 3) |
| 3. PEE70 (Mw 100K) | $(PEE)_{70}/(PE)_{30}$ | 6.38 |
| | | 6.4 (Note 2) |
| | | 6.5 ± 0.2 (Note 3) |
| 4. PEP (Mw 23K) | $(PEP)_{94}/(PiPE)_{6}$ | 7.2 |
| 5. PEP-PEP29 Diblock | 50: (PEP; Ex. 4) – | 7.2 – 6.19 |
| | 50: (PEP 29; Ex. 2) | (respective blocks) |
| 6. PS-PEP29 (block/ | 50: (polystyrene) – | 6.19 |
| segment copolymer) | 50: (PEP29; Ex. 2) | (PEP29 segment) |
| 7. PMMA-PEP29 (block/ | 32: (PMMA) – | 6.19 |
| segment copolymer) | 68: (PEP 29; Ex. 2) | (PEP29 segment) |
| 8. PEP29/$CO_2$H | [(PEP29, Ex. 2)-]-$CO_2$H | 6.19 (PEP29 segment) |
| 9. PEP (Mw 50K) | $(PEP)_{94}/(PiPE)_{6}$ | 7.2 |
| 10. PS-PEE-70 (block/ | 50: (polystyrene) – | 6.38 |
| segment copolmer) | 50: (PEE-70; Ex. 3) | (PEE-70 block) |

Notes:
1. Determined using the Gaussian coil approximation, unless otherwise indicated.
2. Calculated from most recent best estimate of SL for PiPE in which we have estimated $a_{PEP}$ = 7.3Å, $a_{PiPE}$ = 4.2Å, and $a_{PMEE}$ = 7.2Å from the SANS studies reported for three types of hydrogenated polyisoprene random copolymers (L. J. Fetters, D. J. Lohse, D. Richter, T. A. Witten. The reduced PiPE estimate of SL reduces the calculated SL value for PEP29 by about 0.6 units, to 5.6.
3. By SANS measurement and calculation as described in the detailed SANS Examples section below.

SANS Experiments, Segment Length (SL or "a") Measurement (Detailed) A. Synthesis of SANS Examples 1–4 In order to establish the statistical segment length (SL or "a") of PEE70 (e.g. Ex's 1 or 3) and PEP29 (e.g. Ex. 2), small angle neutron scattering (SANS) experiments were conducted using hydrogenated (H) and partially deuterated (D) versions of these materials. Fully hydrogenated forms of each were prepared by heterogeneous catalytic hydrogenation of the precursor polydiene. By substituting deuterium for hydrogen in these saturation reactions partial deuterium labeling was accomplished. Two PEP copolymers were produced with $M_w \approx 25,000$ g/mole and $M_w/M_n \approx 1.04$ from 1,4 polyisoprene (mostly cis), and the reaction conditions specified in Example 4 to provide PEP29(H) and PEP29(D), the SANS Examples 1 and 2 of Table 2 B. Likewise, $M_w \approx 100,000$ and $M_w \approx 25,000$ g/mole 1,2 polybutadienes ($M_w/M_n \approx 1.04$) were prepared as in Examples 3 and 1, respectively, and hydrogenated and deuterated, respectively, to provide PEE70(H) and PEE70(D), the SANS Examples 3 and 4 of Table 2 B. The degree of saturation was verified to be essentially complete (>99%) by solution NMR analysis. Densities were measured and the deuterium content was determined using density gradient measurements conducted at 23° C. Table 2 B summarizes some of the data for these 4 copolymers.

TABLE 2B

Polyolefins Studied with Small Angle Neutron Scattering

| SANS Examples [1] | Formula | N [2] | $\rho(25°$ C.), g/cc |
|---|---|---|---|
| 1. PEP29(H) 25K | $(C_5H_{10})N$ | 446 | 0.8742 |
| 2. PEP29(D) 25K | $(C_5H_{6.07}D_{3.93})N$ | 446 | 0.9232 |
| 3. PEE70(H) 100K | $(C_4H_8)N$ | 1790 | 0.8686 |
| 4. PEE70(D) 25K | $(C_4H_{5.23}D_{2.77})N$ | 446 | 0.9115 |

Notes:
(1) Prepared as described above; microstructure presented in Table 1.
(2) N, the approximate degree of polymerization, is defined by a segment volume of 108Å$^3$ B. Blends and SANS Studies SANS specimens of blends were prepared by dissolving the blend components in cyclohexane and mixing the resultant solutions, followed by solvent evaporation and drying under vacuum for 24 hours. For these experiments, the SANS blends each contained 50% by volume of each component, i.e., volume fraction, $\phi_1=0.5$. Neutron scattering cells were prepared by depositing the dried blend mixture onto 2.5 cm diameter by 1.5 mm thick quartz optical flats, and pressing the mixture to a thickness of 1.25 mm using a second quartz window. This thickness was maintained by an aluminum spacer ring. The resulting assembly was then sealed using a two component epoxy adhesive. A list of SANS blends prepared from SANS Examples 1–4 is provided in Table 2C. SANS measurements were conducted on the 30 meters instrument located at ORNL. A description of this machine and the procedures used to obtain the desired data are given by the Bates and Wignall references stated above. The measurements reported here were performed at 23° C., well above the glass transition temperature of the pure components.

C. Results from SANS Experiments to Confirm Segment Length Values of the SL for each blend (SANS Examples ½, ¾, and ¼ of Table 2C) were obtained by analyzing the experimental data according to standard procedures described in the Wignall reference. Table 2C summarizes the SANS results. The critical value of the interaction parameter ($\chi_c$) for each blend is also provided in this Table. The SANS-measured $\chi$ parameter is smaller than the critical value for each blend ($\chi<\chi_c$), thus all three blends are characterized as miscible, homogeneous blends. Table 2C shows that the statistical segment lengths at constant segment volume $\upsilon=108$ Å$^3$, are $a_{PEP29}=5.7$ Å and $a_{PEE70}=6.5$ Å each subject to an estimated error of ±0.2 Å. These values can be compared with those calculated from the Gaussian coil approximation for random copolymers described earlier. Using $a_{PE}=8.8$ Å (extrapolated to 25° C.) and $a_{PEE}=5.0$ Å it was calculated that $a_{PEE70}=6.4$ Å which is within experimental error of the experimentally determined value of 6.5±0.2 Å (Table 2A). Similarly, using data for the microstructures present in the PEP29 material (Tables 1 and 2A and Table 2C Note 2), it was calculated that $a_{PEP29}=5.6$ Å which is also within experimental error of the SANS-measured value. These results demonstrated the viability of the Gaussian coil approximation for calculating "a" (segment length) values.

TABLE 2C

SANS Results from Blends Studied

| Copolymer Blend of SANS Example Nos. | Volume Fraction | $\chi_c$ | SL,Å | $\chi$ | Miscible? $\chi<\chi_c$? |
|---|---|---|---|---|---|
| SANS Ex Nos. 1/2: | | | | | |
| PEP29(H)/ PEP29(D) | 0.5 | 0.0045 | 5.7 ± 0.2 | 0.00085[1] | yes |
| Ex. Nos. 3/4: | | | | | |
| PEE70(H)/ PEE70(D) | 0.5 | 0.0025 | 6.5 ± 0.2 | 0.00080[1] | yes |
| Ex. Nos. 1/4: | | | | | |
| PEP29(H)/ PEE70(D) | 0.5 | 0.0045 | 6.5 ± 0.2 | 0.0038 [2] | yes |

(1) For the mixtures [(PEP29(H)/PEP29(D) and PEE70(H)/PEE70(D)] $\chi \approx$ 0.0008. This value is attributed to isotope effects (see, for example the Bates and Wignall 1991 reference.)
(2) When corrected for the isotope effect, Note 1, the Chi parameter due to SL difference is 0.0030.

Preliminary Blend Miscibility Experiments: PEE-70 (Ex. 1) and PEP-29 (Ex. 2) with PP.

Preliminary miscibility experiments were performed with fractionated isotactic polypropylene (PP), the PP characterized by $M_w=47,500$ and $M_n=21,300$ g/mol (designated "PP-45K") obtained from American Polymer Standards, Mentor, Ohio. Specimens of PEE-70 (Example 1) and PEP-29 (Example 2) were individually codissolved with PP-45K (50:50 w/w) in degassed decahydronaphthalene to yield a 2% w/v solution at 125° C. for 1–2 hours under argon and precipitated in isopropanol at 25° C. The coprecipitated, and thus intimately-mixed, polymer blends were then dried at 100° C. under vacuum overnight. Small pieces (≈5 mg) of each precipitant blend were placed on hot (180–200° C.) glass slides. The samples instantly melted and were covered with glass cover slips. After 2–15 minutes, the samples were rapidly cooled to room temperature by quenching with 25° C. methanol to lock in the high temperature structure of the polymer blends; the structure is frozen by the crystallization of polypropylene (which occurs even during rapid cooling). Control experiments were performed by similarly preparing microscope specimens of pure PP-45K and of an immiscible blend (PP-45K, SL of 6.2, and poly(ethylene-propylene) ("PEP", SL of 7.2).

Examination of the pure PP-45K sample by optical microscopy at 100× magnification revealed only a slight heterogeneity due to the semicrystalline nature of the quenched polypropylene. As expected, the immiscible blend of the PP-45K and the PEP polymers clearly revealed macroscopic phase separation. However, each of the PEE-70/PP-45K (having SL's, respectively, of 6.38 and 6.2) blend and the PEP-29/PP-45K (having SL's, respectively, of 6.19 and 6.2) blend showed the lack of any gross phase separation at 100× magnification and were obviously miscible. Moreover, the latter two blends were more optically clear than the pure PP-45K sample, a further indication that the PEE-70 and PEP-29 polymers were miscible with the polypropylene.

Optical Studies of PEP, PEP29, and PEE70 with PP

Blends ($\phi=0.50$, w/w) of polypropylene ("HP-6523", characterized by Mw about 300,000, stabilized, and obtained from Himont Corp., or a minimally stabilized HP-6523, designated "HP6501") with 23K PEP (Ex. 4), 25K PEP29 (Ex. 2), and 25K PEE-70 (Ex. 1), were prepared by co-dissolution in hot (120–140° C.) decahydronaphthalene followed by precipitation in isopropanol and vacuum drying at 100° C. overnight. About 0.5 grams of each of the dried precipitants were first pressed to 0.65 mm thickness in a vice and then pressed between two hot glass slides at 200° C. to a thickness of 0.52 mm and annealed for 10 minutes. The mixtures were then quenched in a methanol bath.

Measurements of the clarity of the mixtures were then performed by observing the maximum distance at which print of about 5 mm in height could be read through the polymer films. The results are given in Table D, below.

TABLE D

Blend and Maximum Distance for 5 mm Print Readability

| Blend | Maximum Distance |
| --- | --- |
| PP (HP-6523) + 23k PEP | Approx. 1 mm. (very cloudy) |
| PP (HP-6501) + 25k PEP29 | Approx. 50 cm. (slightly cloudy) |
| PP (HP-6501) + 25k PEE70 | >5 m.(very clear) |

Thus, there is a dramatic increase in the clarity of the blends of polypropylene (PP) with modifying polyolefins PEP29 or PEE70 (shown previously) compared with the poor clarity of the mixture of PP with PEP. Among these samples, the best clarity improvement was shown in the PP+PEE70 blend, where the SL values, respectively, are 6.2 and 6.38.

Melt Blend Results

Blend 1: 10% PEE70 (Determined SL=6.38) in Polypropylene (SL=6.20)

10 parts of PEE70, Example 1, was blended with 90 parts of PP(HP-6523) on the mill as described above. A plaque was prepared by pressing the hot melt in the press described. The measured crystallization temperature was 113 degrees C. The notched Izod impact strength was 36 Joules/meter.

Blends 2–4: PEE70 in Polypropylene

The PEE70 of Example 1 was evaluated at three additional loadings (0.4%, 1.2%, and 3.5%) in polypropylene prepared as described for blend 1.

The results of the Blend 1–4 experiments are in Table 3. These and the clarity results described above demonstrate that 25,000 molecular weight PEE70 gives rise to an increase in impact strength and rate of crystallization while maintaining or increasing the clarity levels as low as 0.4% are sufficient to increase the crystallization temperature, while higher levels are required for a noticeable impact strength effect.

TABLE 3

PEE70/Polypropylene Blends

| Blend # | PEE70 % | Clarity Rating | Contact Clarity Rating | Luminous Trans, % | Notched Izod, J/m | Crystallization Temp. C. | Crystallinity, % of PP |
| --- | --- | --- | --- | --- | --- | --- | --- |
| Control | 0 | 0 | 0 | 90.83 | 23 | 109.1 | 50 |
| 1 | 0.4 | 2 | 4 | 90.41 | 20 | 112.9 | 50 |
| 2 | 1.2 | 0 | 0 | 91.12 | 22 | 116.6 | 47 |
| 3 | 3.5 | 2 | 4 | 90.75 | 24 | 112.6 | 53 |
| 4 | 10 | 3 | 4 | 91.19 | 36 | 113.3 | 57 |

Blends 5–8: PEP29 (SL=6.19) in Polypropylene (SL=6.20)

The PEP29 of Example 2 was blended with polypropylene (HP-6523) at levels of 0.4, 1.2, 3.5, and 9%. Evaluation results are in Table 4. The 25,000 molecular weight PEP29, at levels as low as 0.4%, gives rise to an increase in crystallization temperature.

TABLE 4

PEP29/Polypropylene Blends

| Blend # | PEP29 % | Clarity Rating | Contact Clarity Rating | Luminous Trans, % | Notched Izod, J/m | Crystallization Temp. C. | Crystallinity, % of PP |
| --- | --- | --- | --- | --- | --- | --- | --- |
| Control | 0 | 0 | 0 | 90.45 | 21 | 108.8 | 49 |
| 5 | 0.4 | 2 | 2 | 90.29 | 20 | 111.9 | 48 |
| 6 | 1.2 | 0 | 0 | 90.59 | 20 | 112.1 | 49 |
| 7 | 3.5 | 3 | 3 | 90.92 | 19 | 114.6 | 50 |
| 8 | 9 | 0 | 0 | 91.28 | 18 | 113.1 | 55 |

Blends 9–11: PEP (SL=7.20) in Polypropylene (SL=6.20)

The PEP of Example 4, a polyolefin with SL=7.2, substantially higher than the SL of PP, was also blended with polypropylene (HP-6523) at levels of 0.4, 1.2, and 3.5%. Evaluation results are in Table 5. Unlike those modifying polyolefins having an SL within about 10% of that of polypropylene, PEP does not give rise to an increase in crystallization temperature and confers less transparency.

TABLE 5

PEP/Polypropylene Blends

| Blend # | PEP % | Clarity Rating | Contact Clarity Rating | Luminous Trans, % | Notched Izod, J/m | Cystallization Temp. C. | Cystallinity, % of PP |
|---|---|---|---|---|---|---|---|
| Control | 0 | 0 | 0 | 90.69 | 18 | 106.8 | 50 |
| 9 | 0.4 | −1 | −1 | 90.74 | — | 108.1 | 48 |
| 10 | 1.2 | 0 | −1 | 91.68 | — | 108.9 | 50 |
| 11 | 3.5 | 0 | 0 | 89.96 | 26 | 107.9 | 50 |

Blends 12–15: 100,000 Molecular Weight PEE70 (SL=6.38) in Polypropylene (SL=6.20)

The 100,000 Mw PEE70 of Example 3 was evaluated at four loadings (0.4%, 1.2%, 3.5% and 10%) in polypropylene, prepared as described for blend 1. The results are in Table 6 and show that the 100,000 molecular weight PEE70 increases the impact strength while maintaining or increasing the transmittance.

TABLE 6

100,000 Molecular weight PEE70/Polypropylene Blends

| Blend # | PEE70 % | Clarity Rating | Contact Clarity Rating | Luminous Trans, % | Notched Izod, J/m | Crystallization Temp. C. | Crystallinity, % of PP |
|---|---|---|---|---|---|---|---|
| Control | 0 | 0 | 0 | 90.69 | 18 | 106.8 | 50 |
| 12 | 0.4 | 0 | 1 | 90.74 | — | 104.8 | 49 |
| 13 | 1.2 | 0 | 0 | 90.70 | — | 104.5 | 49 |
| 14 | 3.5 | 1 | 0 | 91.00 | 25 | 104.6 | 49 |
| 15 | 10 | 0 | 1 | 91.89 | 46 | 104.7 | 50 |

Blends 16–19: Evaluation of a Segmented Copolymer with a Polypropylene Miscible Block (PEP29, SL=6.38) and a Polypropylene Immiscible Block (PEP, SL=7.30), the Diblock Polymer of Ex. 5.

The PEP-PEP29 Diblock Copolymer of Example 5 was evaluated at four loadings (0.4%, 1.2%, 3.5% and 10%) in polypropylene as described for blend 1. The results are in Table 7 and show that the modifying polyolefin diblock copolymer increases the impact strength while maintaining or increasing the transmittance. Thus, a diblock modifying polymer having at least one melt-miscible polyolefin block (segment) is effective in modifying a primary polyolefin such as polypropylene.

TABLE 7

Block Copolymer/Polypropylene Blends

| Blend # | Ex.5 % | Clarity Rating | Contact Clarity Rating | Luminous Trans, % | Notched Izod, J/m | Crystallization Temp. C. | Crystallinity, % of PP |
|---|---|---|---|---|---|---|---|
| Control | 0 | 0 | 0 | 90.69 | 18 | 106.8 | 50 |
| 16 | 0.4 | 0 | 0 | 91.07 | — | 105.7 | 50 |
| 17 | 1.2 | 4 | 3 | 91.33 | — | 106.1 | 49 |
| 18 | 3.5 | 1 | 0 | 90.87 | 24 | 106.5 | 49 |
| 19 | 10 | 1 | 0 | 92.08 | 34 | 106.4 | 50 |

Blend 20: Evaluation of an Olefin-Olefin Block Copolymer (PEP-PEP29) as a Compatibilizer of a Blend of two Immiscible Polyolefins A blend of 90% PP, 8.3% PEP ($M_w$, 50,000), Example 9, and 1.7% PEP-PEP29 (Example 5) was prepared by procedures described for blend 1. DSC indicated a crystallization temperature of 112 degrees C and a degree of crystallinity of 49% for the polypropylene component, indicating that some degree of compatibilization has occurred between the immiscible PP/PEP blend and a low level (1.7%) of the PEP-PEP29 modifying polyolefin diblock polymers.

Blend 21: Evaluation of a PS-PEP29 Block Copolymer

Four grams of the PS-PEP29 Block Copolymer of Example 6 is blended with 96 grams of propylene homopolymer (mfr=4, condition L) on a 2-roll mill set at 195° C. After the material fluxes it is mixed an additional 3 minutes. While still hot the material is transferred to a press and formed into a 0.15×24 ×24 cm sheet. A sag test is performed on a 0.15×10×10 cm section as follows. The section is clamped in a metal frame with a 7.6 cm square opening. Metal rulers are attached to the frame for measurement of sag. The frame and sheet are placed in a 190° C. forced air oven. The amount of sheet sag is observed through a window in the oven door. The sheet prepared from the blend of PP modified with the PS-PEP29 block copolymer (modifying polyolefin) beneficially sags more slowly than an unmodified polypropylene sheet tested by the same procedure.

Blends 22–23: Evaluation of a PS-PEP29 Block Copolymer

Blends containing 0.5% and 2% of the block copolymer of Example 6 are prepared and evaluated as in Blend 21. These also sag more slowly than the unmodified polypropylene control, showing the effect of very low levels (0.5 and 2% on the blend weight) of the PS-PEP29 block copolymer on PP sag.

Blends 24–32: Evaluation of a PS-PEP29 Block Copolymer as a Compatibilizer of Polypropylene/Polystyrene Blends Blends of propylene homopolymer (mfr=0.8) and polystyrene (a general purpose polystyrene, mfr 8 and of specific gravity 1.05, obtained from Amoco Corp.) are prepared according to the formulations in Table 8. The blends are mixed in a Haake Rheocord at 210° C. The blends are then granulated and pressed into sheets 0.3 cm thick at 220° C. Those blends containing the PS-PEP29 block copolymer of Example 6 all have higher tensile strengths than the corresponding blends (Blends 24, 27, 30) containing no compatibilizer. Blends 25, 26, 28 and 29 are affected less by immersion in acetone or xylene than an unmodified polystyrene control. Blends 28, 29, 31 and 32 are stiffer than a polypropylene control, as measured by tensile modulus.

TABLE 8

Compatibilized Polypropylene/Polystyrene Blends

| Blend 24 | 20% PP | 80% PS | — |
| Blend 25 | 19.5% PP | 78% PS | 2.5% PS-PFP29 |
| Blend 26 | 18% PP | 72% PS | 10% PS-PEP29 |
| Blend 27 | 50% PP | 50% PS | — |
| Blend 28 | 48% PP | 48% PS | 4% PS-PEP29 |
| Blend 29 | 45% PP | 45% PS | 10% PS-PEP29 |
| Blend 30 | 75% PP | 25% PS | — |
| Blend 31 | 72% PP | 24% PS | 4% PS-PEP29 |
| Blend 32 | 67.5% PP | 22.5% PS | 10% PS-PEP29 |

Blends 33–35: Evaluation of a PS-PEP29 Block Copolymer as a Compatibilizer of Polypropylene/Polyphenylene Ether Blends Polypropylene/polyphenylene ether [poly(2,6-dimethylphenylene oxide); spec. gravity 1.1, obtained from the General Electric Company)] blends listed in table 9 are prepared by the procedure described for blends 24–32. Temperatures for blending and sheet fabrication are 240° C. Those containing the PS-PEP29 block copolymer (blends 34, 35, 37, and 38) all have higher tensile strengths than the corresponding blend containing no compatibilizer (blends 33 or 36), indicating increased compatibility. Blends 34 and 35 are less affected by isopropyl alcohol or acetone than an unmodified polyphenylene ether control. Blends 37 and 38 are stiffer and can support a load at higher temperatures compared to an unmodified polypropylene control.

TABLE 9

Compatibilized PP/Polyphenylene Ether (PPE) Blends

| Blend 33 | 20% PP | 80% PPE | 0% PS-PEP29 |
| Blend 34 | 19.5% PP | 78% PPE | 2.5% PS-PEP29 |
| Blend 35 | 18% PP | 72% PPE | 10% PS-PEP29 |
| Blend 36 | 75% PP | 25% PPE | 0% PS-PEP29 |
| Blend 37 | 72% PP | 24% PPE | 4% PS-PEP29 |
| Blend 38 | 67.5% PP | 22.5% PPE | 10% PS-PEP29 |

Blends 39–41: Evaluation of a PMMA-PEP29 Block Copolymer

Sheets identical to those of blends 21-23, except for substitution of the PMMA-PEP29 block copolymer of Example 7 for the PS-PEP29 block copolymer, are prepared. Results of the sag test indicate that the PMMA-PEP29 block copolymer reduces sag compared to the PP control. The DSC indicates that the crystallization temperature is higher than that of the unmodified polypropylene control.

Blends 42–57: Evaluation of a PMMA-PEP29 Block Copolymer as a Compatibilizer.

Blends of polypropylene with polymethyl methacrylate (PMMA, mfr 15 (cond. I) and specific gravity 1.18), acrylonitrile-butadiene-styrene terpolymer (ABS, mfr 5 (cond. I) and specific gravity 1.05), polycarbonate (PC, mfr 16.5 (cond. O), specific gravity 1.20), and polyethylene terephthalate (PET, m.p. 245° C. and specific gravity 1.4 and intrin. visc. 0.74) are prepared as described for blends 24–32. The formulations, listed in Table 10, are processed at temperatures of 200 to 275 degrees C. In all cases the PMMA-PEP29 compatibilizes the blend, as indicated by an increase in tensile strength.

TABLE 10

Compatibilized Polypropylene Blends

| Blend 42 | 25% PP | 75% PMMA | — |
| Blend 43 | 24% PP | 72% PMMA | 4% PMMA-PEP29 |
| Blend 44 | 75% PP | 25% PMMA | — |
| Blend 45 | 72% PP | 24% PMMA | 4% PMMA-PEP29 |
| Blend 46 | 25% PP | 75% ABS | — |
| Blend 47 | 24% PP | 72% ABS | 4% PMMA-PEP29 |
| Blend 48 | 75% PP | 25% ABS | — |
| Blend 49 | 72% PP | 24% ABS | 4% PMMA-PEP29 |
| Blend 50 | 25% PP | 75% PC | — |
| Blend 51 | 24% PP | 72% PC | 4% PMMA-PEP29 |
| Blend 52 | 75% PP | 25% pc | — |
| Blend 53 | 72% PP | 24% PC | 4% PMMA-PEP29 |
| Blend 54 | 25% PP | 75% PET | — |
| Blend 55 | 24% PP | 72% PET | 4% PMMA-PEP29 |
| Blend 56 | 75% PP | 25% PET | — |
| Blend 57 | 72% PP | 24% PET | 4% PMMA-PEP29 |

Blend 58: Enhancement of Surface Polarity of Polypropylene

A blend of 20 parts of the carboxy-terminated PEP29 of Example 8 and 80 parts polypropylene is prepared in a Haake Rheocord and pressed into a sheet as described for Blend 21. Compared to an unmodified polypropylene, the surface polarity is increased as shown by behavior toward a paint. When coated with a solvent based (or a water based) paint, the modified sheet develops a more uniform surface coating.

Blend 59: Reactive Compounding of Carboxy-Terminated Polyolefin

A blend of 20 parts PP, 75 parts nylon 6, and 5 parts of the carboxy-terminated PEP29 of Example 8 is compounded in a Haake Rheocord and pressed into a sheet at 270° C. as described for blends 24–32. The tensile strength of the modified blend is greater than that of a control blend containing no modifying polyolefin compatibilizer. The modified blend also warps less in humid environments when compared to an unmodified nylon control.

Blend 60: Reactive Compounding of Carboxy-Terminated Polyolefin

A blend of 70 parts PP, 25 parts nylon 6, and 5 parts of the carboxy-terminated PEP29 of Example 8 is compounded in a Haake Rheocord and pressed into a sheet at 260° C. as described for examples 24–32. The tensile strength of the modified blend is greater than that of a control blend containing no modifying polyolefin compatibilizer. A coated sheet has a more uniform appearance compared to a coated sheet of the unmodified polypropylene.

Blends 61–64: Evaluation of PS-PEE70 Block Copolymer as a Polypropylene Additive A blend of the 100,000 molecular weight PS-PEE70 Diblock Copolymer (Example 10) and polypropylene homopolymer was prepared and evaluated (Blend 61). 0.30 grams of the PS-PEE70 Diblock Copolymer was blended with 59.70 grams of propylene homopolymer (mfr=4, condition L) on a 2-roll mill set at 195° C. Antioxidants (0.15 grams each of 1,3,5-triazine trione (Cyanox™ 17901 and tris(2,3-di-tertiarybutylphenyl) phosphite) also were added. After the material fluxed it was mixed an additional 3 minutes. While still hot the material was transferred to a hot press and formed into a 0.15×24×24 cm sheet. A sample was heated to 200 degrees C in a DSC and cooled at 10 degrees C per minute. Under these conditions the maximum crystallization occurred at 112 degrees C. This is an increase of 6 degrees C when compared to an unmodified polypropylene control with antioxidants added through the same process (Blend 62). PS-PEE70 Diblock Copolymer acts as a crystallization nucleator for polypropylene.

By similar procedures, blends of 1.5% (Blend 63) and 4% (Blend 64) PS-PEE70 Diblock Copolymer in propylene homopolymer were prepared. A sample of Blend 64 was prepared for transmission electron microscopy (TEM) by cutting a thin section at low temperature and exposing to ruthenium tetroxide. The ruthenium tetroxide selectively stained the styrene. If the PEE-70 were not miscible with the polypropylene the modifying polyolefin would form large domains and the TEM would appear as polystyrene domains grouped together in clumps of PEE70. If PEE70 were miscible with polypropylene one would expect to see individual domains of polystyrene well dispersed in the polypropylene through attachment to the polypropylene-miscible PEE70. The domain diameter would be on the order of 0.02 microns. The TEM is reproduced in FIG. 2 and indeed shows that PEE70 is miscible with polypropylene. The well dispersed polystyrene domain size is on the order of 0.02–0.04 microns.

Table 11, following, summarizes several blend components and their molecular weights, respective SL's, the differences in SL (% Δa), and their 50/50 volume/weight fraction miscibility as measured or observed by SANS or optical methods. The data summarize observations of several miscible blends having molecular weights within the Mw limits prescribed by foregoing Tables B and C.

Other embodiments of the invention will be apparent to those skilled in the art from a consideration of the specification or practice of the invention disclosed herein. It is intended that the specification and examples be considered exemplary only, with the true scope and spirit of the invention indicated by the following claims.

TABLE 11

Examples of Polyolefin Miscibility versus %Δa at 50/50 Volume Fractions ($\phi = 0.5$)

| Polymer "A", $M_w$ | Polymer "B", $M_w$ | $a_A$, Å | $a_B$, Å | %Δa | Blend A and B Miscible? | Method of Determining Miscibility |
|---|---|---|---|---|---|---|
| PEP29(H), 25k (SANS Ex. 1) | PEP29(D), 25k (SANS Ex. 2) | 5.7 | 5.7 | 0 | yes | SANS |
| PEE70(H), 100k Ex. 1 | PEE70(D), 25k Ex. 1 | 6.5 | 6.5 | 0 | yes | SANS |
| PP(HP-6501), 300k | PEE70(D), 25k | 6.2 | 6.5 | 5 | yes | optical |
| PP, 45k | PEE70(D), 25k | 6.2 | 6.5 | 5 | yes | optical |
| PP, 45k | PEP29(D), 25k Ex. 2 | 6.2 | 5.7 | 9 | yes | optical |
| PP(HP-6501), 300k | PEP29(D), 25k | 6.2 | 5.7 | 9 | yes | optical |
| PEE70(D), 25k | PEP29(H), 25k | 6.5 | 5.7 | 14 | yes | SANS |
| PEP, 23k Ex. 4 | PP(HP-6523), 300k | 7.2 | 6.2 | 16 | no | optical |
| PEP, 23k | PP, 45k | 7.2 | 6.2 | 16 | no | optical |

We claim:

1. A process for making a polyolefin blend, comprising: coating a primary polyolefin selected from polypropylene or ethylene/alpha-olefin copolymer having a primary polyolefin segment length within a range of absolute value of from about 4.2 to about 8.8, with at least one modifying polyolefin comprising a random copolymer of ethylene and one or more monomer units selected from propylene, 1-butene, butadiene, 1-pentene, 1-hexene, 1-octene, isoprene, 2-methyl-1-butene, 3-methyl-1-butene, 4-methyl-1-pentene, or mixtures thereof.

2. The process of claim 1 wherein the modifying polyolefin comprises a block copolymer.

3. The process of claim 2 wherein the block copolymer further comprises a terminal functional fragment.

4. A coated polyolefin made from the process of claim 1.

5. A coated polyolefin made from the process of claim 4.

* * * * *

UNITED STATES PATENT AND TRADEMARK OFFICE
CERTIFICATE OF CORRECTION

PATENT NO. : 5,955,546
DATED : September 21, 1999
INVENTOR(S) : Bates et al.

Page 1 of 1

It is certified that error appears in the above-identified patent and that said Letters Patent is hereby corrected as shown below:

Column 1,
Line 9, after "by reference." insert -- This invention was made under United States Government Contract Number AFOSR-90-0207B, U.S. Air Force, Air Force Office of Scientific Research. This invention was made with Government support under Presidential Young Investigator Grant Number DMR-8957386-03, awarded by the National Science Foundation. The Government has certain rights in this invention. --.

Column 34,
Line 39, after "Witten" insert -- Macromolecules, 27(17), pp. 4639-4647 (1994) --.

Signed and Sealed this

Sixteenth Day of October, 2001

Attest:

NICHOLAS P. GODICI
Attesting Officer      Acting Director of the United States Patent and Trademark Office